(12) United States Patent
Yun et al.

(10) Patent No.: US 10,466,859 B2
(45) Date of Patent: Nov. 5, 2019

(54) METHOD AND SYSTEM FOR CREATING A SITE ON A USER TERMINAL

(71) Applicant: NAVER Corporation, Seongnam-si (KR)

(72) Inventors: Jong Ho Yun, Seongnam-si (KR); Jungho Jun, Seongnam-si (KR); Sung Won Cha, Seongnam-si (KR); Se-Young Kim, Seongnam-si (KR); Sang Jun Jeon, Seongnam-si (KR); DongHwan Park, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 170 days.

(21) Appl. No.: 14/617,243

(22) Filed: Feb. 9, 2015

(65) Prior Publication Data
US 2015/0227270 A1 Aug. 13, 2015

(30) Foreign Application Priority Data

Feb. 10, 2014 (KR) .......................... 10-2014-0015035
Apr. 22, 2014 (KR) .......................... 10-2014-0048103
(Continued)

(51) Int. Cl.
*G06F 3/0482* (2013.01)
*G06F 17/30* (2006.01)
(Continued)

(52) U.S. Cl.
CPC .......... *G06F 3/0482* (2013.01); *G06F 3/0483* (2013.01); *G06F 3/0484* (2013.01);
(Continued)

(58) Field of Classification Search
CPC ......... G06F 17/30056; G06F 17/30017; G06F 17/211; G06F 17/2235; G06F 17/30014;
(Continued)

(56) References Cited

U.S. PATENT DOCUMENTS

| 4,982,344 A * | 1/1991 | Jordan | .............. | G06F 17/30014 |
| | | | | 707/E17.013 |
| 2002/0156812 A1* | 10/2002 | Krasnoiarov | ..... | G06F 17/30867 |
| | | | | 715/234 |

(Continued)

FOREIGN PATENT DOCUMENTS

| JP | 10-133988 | 5/1998 |
| JP | 2001-256210 | 9/2001 |

(Continued)

OTHER PUBLICATIONS

New slide and Layout Office Theme in PowerPoint 2010, pp. 1-3 (Year: 2010).*

(Continued)

*Primary Examiner* — Stephen S Hong
*Assistant Examiner* — Ahamed I Nazar
(74) *Attorney, Agent, or Firm* — Greer, Burns & Crain, Ltd.

(57) ABSTRACT

A method for creating a site on a user terminal connected by a computer network to a site management system includes providing a plurality of cards having predefined functions to the user terminal; and creating a site including at least one of a page corresponding to a card selected at the user terminal by a user from among the plurality of cards and a page including, as a component, at least one card selected at the terminal. The plurality of cards includes a general card configured through a selection and a combination of components by the user and a function card of which a function and a structure are predetermined.

22 Claims, 19 Drawing Sheets

(30) Foreign Application Priority Data

Apr. 22, 2014 (KR) .................. 10-2014-0048104
Apr. 22, 2014 (KR) .................. 10-2014-0048105

(51) Int. Cl.

| | | |
|---|---|---|
| *G06F 16/955* | (2019.01) | |
| *G06F 3/0488* | (2013.01) | |
| *G06F 3/0483* | (2013.01) | |
| *G06F 3/0484* | (2013.01) | |
| *G06F 16/21* | (2019.01) | |
| *G06F 16/958* | (2019.01) | |

(52) U.S. Cl.
CPC ........ *G06F 3/0488* (2013.01); *G06F 3/04886* (2013.01); *G06F 16/211* (2019.01); *G06F 16/958* (2019.01); *G06F 16/9566* (2019.01)

(58) Field of Classification Search
CPC .. G06F 17/2247; G06F 17/248; G06F 17/218; G06F 3/0482; G06F 16/958; G06F 16/211; G06F 16/9566; G06F 3/04886; G06F 3/0484; G06F 3/0488; G06F 3/0483; G06F 17/30

See application file for complete search history.

(56) References Cited

U.S. PATENT DOCUMENTS

| | | | | |
|---|---|---|---|---|
| 2007/0157082 A1* | 7/2007 | Green | ............... | G06F 16/954 715/234 |
| 2007/0162842 A1* | 7/2007 | Ambachtsheer | .... | G06F 17/2247 715/205 |
| 2008/0040322 A1* | 2/2008 | Rucker | ............. | G06F 17/30896 |
| 2008/0313533 A1* | 12/2008 | Hoyer | ............... | G06F 17/211 715/243 |
| 2009/0172559 A1* | 7/2009 | Waldman | ............... | G06F 17/211 715/744 |
| 2010/0094901 A1* | 4/2010 | Edwards | ........... | G06F 17/30654 707/772 |
| 2010/0312724 A1* | 12/2010 | Pinckney | ............. | G06N 99/005 706/11 |
| 2013/0227390 A1* | 8/2013 | Pereymer | ............ | G06F 17/2247 715/234 |
| 2014/0026037 A1* | 1/2014 | Garb | ..................... | G06F 16/972 715/235 |
| 2014/0075283 A1* | 3/2014 | Coursol | ................ | G06F 16/958 715/234 |
| 2014/0089786 A1* | 3/2014 | Hashmi | ............... | G06F 17/2247 715/234 |
| 2014/0129924 A1* | 5/2014 | Le Bescond de Coatpont | ........... | G06F 17/248 715/234 |
| 2014/0282013 A1* | 9/2014 | Amijee | ................. | G06F 3/0482 715/732 |
| 2014/0282139 A1* | 9/2014 | Balogh | ................... | G06F 17/24 715/765 |
| 2014/0372864 A1* | 12/2014 | Zaragoza | .......... | G06F 17/30867 715/234 |
| 2015/0019545 A1* | 1/2015 | Chedeau | ............... | G06F 17/211 707/725 |
| 2015/0019957 A1* | 1/2015 | Ying | ..................... | G06F 17/248 715/243 |
| 2015/0304383 A1* | 10/2015 | Carroll | .................... | H04L 67/02 709/219 |
| 2015/0310506 A1* | 10/2015 | Saito | .................. | G06Q 30/0185 705/306 |

FOREIGN PATENT DOCUMENTS

| | | |
|---|---|---|
| JP | 2001-337889 | 12/2001 |
| JP | 2006-227772 | 8/2006 |
| JP | 2007-293662 | 11/2007 |
| JP | 2009-80828 | 4/2009 |
| JP | 2010-102621 | 5/2010 |
| JP | 2011-258101 | 12/2011 |
| KR | 2002-0004723 | 1/2002 |
| KR | 2002-0014039 | 2/2002 |
| KR | 10-0523512 | 10/2005 |
| KR | 10-0917672 | 9/2009 |
| KR | 10-2010-0021062 | 2/2010 |
| KR | 10-2011-0054776 | 5/2011 |

OTHER PUBLICATIONS

PowerPoint_2010 New Slides and Corresponding Layout options, pp. 1-3 (Year: 2010).*

Japanese Office Action dated Feb. 9, 2016 by the Japanese Patent Office corresponding to Japanese patent application No. 2015-012239.

Korean Office Action issued in corresponding Korean Patent App. No. 10-2-14-0048103, dated Aug. 14, 2015.

Korean Office Action issued in corresponding Korean Patent App. No. 10-2-14-0048104, dated Aug. 14, 2015.

Korean Office Action issued in corresponding Korean Patent App. No. 10-2-14-0048105, dated Aug. 16, 2015.

* cited by examiner

- Please fill out the columns.

name contact email date title title title

☑ agreement on conditions more ∨ contact

- Here, you can enter only numbers.

essential ☐ You can make an inquiry only when you fills it out.

add inquiries basic type

📞 contact

✉ email

📅 date edition type

ⓐ text type

☑ selection type

METHOD AND SYSTEM FOR CREATING A SITE ON A USER TERMINAL

CROSS-REFERENCE TO RELATED APPLICATION

This application claims priority from and the benefit of Korean Patent Application No. 10-2014-0015035, filed on Feb. 10, 2014, Korean Patent Application No. 10-2014-0048105, filed on Apr. 22, 2014, Korean Patent Application No. 10-2014-0048104, filed on Apr. 22, 2014, and Korean Patent Application No. 10-2014-0048103, filed on Apr. 22, 2014, respectively which are hereby incorporated by reference for all purposes as if fully set forth herein.

BACKGROUND

Example embodiments of the present invention relate to a site management method and system for supporting a creation of a site using various types of cards.

DESCRIPTION OF THE BACKGROUND

Currently, a framework and an infrastructure environment for making a mobile content page suitable for a mobile environment are provided and thus, anybody may easily create a mobile content page.

For example, Korean Registration Patent No. 10-0917672 registered on Sep. 9, 2009, discloses a mobile website making tool for providing a tree-based directory structure. However, in this related art, a user may need to directly design the overall form of a mobile site and also need to directly design and represent all of individual objects.

Accordingly, it is very difficult and complex for a beginner to create a desired mobile site.

Also, the related arts for providing a stereotyped template for each type of business or each subject may provide only a degree of freedom corresponding to a level of replacing content of a corresponding template. For example, a user may be allowed to replace a text, an image, and a moving picture of the same template instead of replacing a template of a predetermined page. To replace a page of a predetermined template with a page of another template, the user may need to find a page of a desired template and edit the page from the beginning.

SUMMARY

Example embodiments of the present invention provide a site management method and system that may support a user to be capable of constructing the overall form of a desired website/mobile site and a form of detail components using a few clicks.

Example embodiments also provide a site management method and system that may provide a user with individual web pages/mobile pages to be included in a website/mobile site in a form of a card in which a variety of functions are predefined, and may support the user to create the website/mobile site through a selection and a combination of provided cards.

Example embodiments also provide a site management method and system that may provide cards classified into a general card corresponding to a card that allows a user to variously couple and use various components on an empty card and a function card including a special function, and may generate new revenues by registering and selling a function card developed by an outside developer.

Example embodiments also provide a site management method and system that may predefine constituent elements for editing a website/mobile site based on a component unit, may provide a user with the predefined constituent elements, and may support the user to create individual web pages/mobile pages to be included in the website/mobile site through a selection and a combination of provided components.

Example embodiments disclose a site management method performed by a computer system, including: providing a plurality of cards; and creating a site including at least one of a page corresponding to a card selected at a terminal of a user from among the plurality of cards and a page including, as a component, at least one card selected at the terminal. The plurality of cards may include a general card configured through a selection and a combination of components by the user and a function card of which a function and a structure are predetermined.

Providing of the plurality of cards may include: managing cards for each category to classify the created site; and providing cards corresponding to a category selected at the terminal of the user.

The components may be configuration units used to classify constituent elements required for a site creation based on at least one of a purpose and a function.

The general card may be configured by combining components selected at the terminal of the user from among components provided based on at least one of a category of the site and the menu of the page.

The function card may include a function card autonomously created and provided to have a special function, and a function card created and registered by an outside developer to have the special function.

The function card may be configured as a single independent page or a single component to be coupled with the general card, based on the selection of the user.

The site management method may further include charging the user based on at least one of the number of function cards used to create the site and the type of a function card.

The site management method may further include charging the user based on the number of times that the function of the function card used to create the site is executed by a visitor of the site.

The site management method may further include selling the function card to the user. The providing of the plurality of cards may include providing the general card and the function card sold to the user to the terminal of the user.

A uniform resource locator (URL) including additional information of a card may be allocated to each of at least two cards among the plurality of cards.

The site management method may further include: receiving a keyword through a terminal of a connector; and providing a card of a URL including additional information associated with the keyword to the terminal of the connector as a landing page.

Example embodiments also disclose a site management method performed by a computer system, including: providing a plurality of cards; creating a site including a page corresponding to a card selected at a terminal of a user from among the plurality of cards and a page including, as a component, at least one card selected at the terminal, a URL including additional information of a card corresponding to a page included in the site or a card included in the page included in the site being allocated to the page included in the site; receiving a keyword through a terminal of a connector; and providing the connector with a page of a URL including additional information associated with the keyword as a landing page.

Example embodiments also disclose a site management system configured as a computer system, including: a card provider configured to provide a plurality of cards; and a site creator configured to create a site including at least one of a page corresponding to a card selected at a terminal of a user from among the plurality of cards and a page including, as a component, at least one card selected at the terminal. The plurality of cards may include a general card configured through a selection and a combination of components by the user and a function card of which a function and a structure are predetermined.

Example embodiments also disclose a site management system configured as a computer system, including: a card provider configured to provide a plurality of cards; a site creator configured to create a site including a page corresponding to a card selected at a terminal of a user from among the plurality of cards and a page including, as a component, at least one card selected at the terminal, a URL including additional information of a card corresponding to a page included in the site or a card included in the page included in the site being allocated to the page included in the site; a keyword receiver configured to receive a keyword through a terminal of a connector; and a page provider configured to provide the connector with a page of a URL including additional information associated with the keyword as a landing page.

Example embodiments also disclose a site management method performed by a computer system, including: managing a plurality of cards to correspond to each of menus configured in advance based on a category; providing the menus configured in advance based on the category, which are transferred through a tool provided for a site creation, and cards selected randomly or based on a predetermined rule for each of the rules; and reselecting cards randomly or based on the predetermined rule for each of the menus, in response to a reconfiguration request transferred through the tool.

The site management method may further include creating a form of a site that includes the menus as menus of the site and includes the cards as pages, in response to an application request transferred through the tool.

The plurality of cards corresponding to each of the menus may have different template structures.

The site management method may further include providing sample images corresponding to the selected cards or the reselected cards.

The site management method may further include providing thumbnails about template structures of cards corresponding to a menu selected from among the menus through the tool.

A card corresponding to the selected menu is replaced based on a thumbnail selected from among the provided thumbnails through the tool.

The site management method may further include: collectively replacing cards for each of the menus with cards in color corresponding to a color change request, in response to the color change request transferred through the tool; and providing the menus in which the cards are replaced.

The site management method may further include counting the number of times that each of the cards is selected for a site creation, based on at least one of a category and a menu. The cards may be selected for each of the menus by applying a user preference to a template structure that is calculated based on the counted number of times.

Example embodiments also disclose a site management system configured as a computer system, including: a card manager configured to manage a plurality of cards to correspond to each of menus configured in advance based on a category; a card provider configured to provide the menus configured in advance based on the category, which are transferred through a tool provided for a site creation, and cards selected randomly or based on a predetermined rule for each of the rules; and a card replacer configured to reselect the cards randomly or based on the predetermined rule for each of the menus, in response to a reconfiguration request transferred through the tool.

Example embodiments also disclose a site management method performed by a computer system, including: providing a plurality of components; creating a card including at least one component selected from among the plurality of components; providing an edition function of editing an individual component included in the card and a reconfiguration function of reconfiguring a component included in the card; and creating a site including at least one of a page corresponding to the card and a page including the card as a single component. The component may be a configuration unit used to classify constituent elements required for a site creation based on at least one of a purpose and a function.

Providing of the edition function and the reconfiguration function may include: providing a tool that includes a component selection area, a preview area, and an attribute edition area to a terminal of the user over a network; adding, to a card selected through the tool, a component selected through the component selection area in order from upward to downward of the selected card; providing a user interface for editing a component selected from the preview area through the attribute edition area; and providing a preview screen of a card including the added or the edited component through the preview area when the component is added or edited.

The preview area may include a user interface for changing orders of components included in the card.

A width of the component may correspond to a width of the selected card.

An importance of the component may be assigned for each attributed assigned based on at least one of a purpose and a function of the component.

When performing crawling at a site using a search robot, the importance may be applied as an importance of information.

Example embodiments also disclose a site management system configured as a computer system, including: a component provider configured to provide a plurality of components; a card creator configured to create a card including at least one component selected from among the plurality of components; a function provider configured to provide an edition function of editing an individual component included in the card and a reconfiguration function of reconfiguring a component included in the card; and a site creator configured to create a site including at least one of a page corresponding to the card and a page including the card as a single component. The component may be a configuration unit used to classify constituent elements required for a site creation based on at least one of a purpose and a function.

It is to be understood that both the foregoing general description and the following detailed description are explanatory and are intended to provide further explanation of the example embodiments as claimed.

Effect of Example Embodiments

According to example embodiments, it is possible to support a user to be capable of constructing the overall form of a desired website/mobile site and a form of detail components using a few clicks.

According to example embodiments, it is possible to provide a user with individual web pages/mobile pages to be included in a website/mobile site in a form of a card in which a variety of functions are predefined, and to support the user to create the website/mobile site through a selection and a combination of provided cards.

According to example embodiments, it is possible to provide cards classified into a general card corresponding to a card that allows a user to variously couple and use various components on an empty card and a function card including a special function, and to make new revenues by registering and selling a function card developed by an outside developer.

According to example embodiments, it is possible to predefine constituent elements required for editing a website/mobile site based on a component unit, to provide a user with the predefined constituent elements, and to support the user to create individual mobile pages to be included in the website/mobile site through a selection and a combination of provided components.

BRIEF DESCRIPTION OF THE DRAWINGS

The accompanying drawings, which are included to provide further understanding of the example embodiments and are incorporated in and constitute a part of this specification, together with the description serve to explain the principles of the example embodiments.

FIG. 8 illustrates an example of a screen for editing a component according to an example embodiment.

FIG. 10 illustrates an example of a screen for editing a read-form card according to an example embodiment.

DETAILED DESCRIPTION OF EXAMPLE EMBODIMENTS

Figure 1:
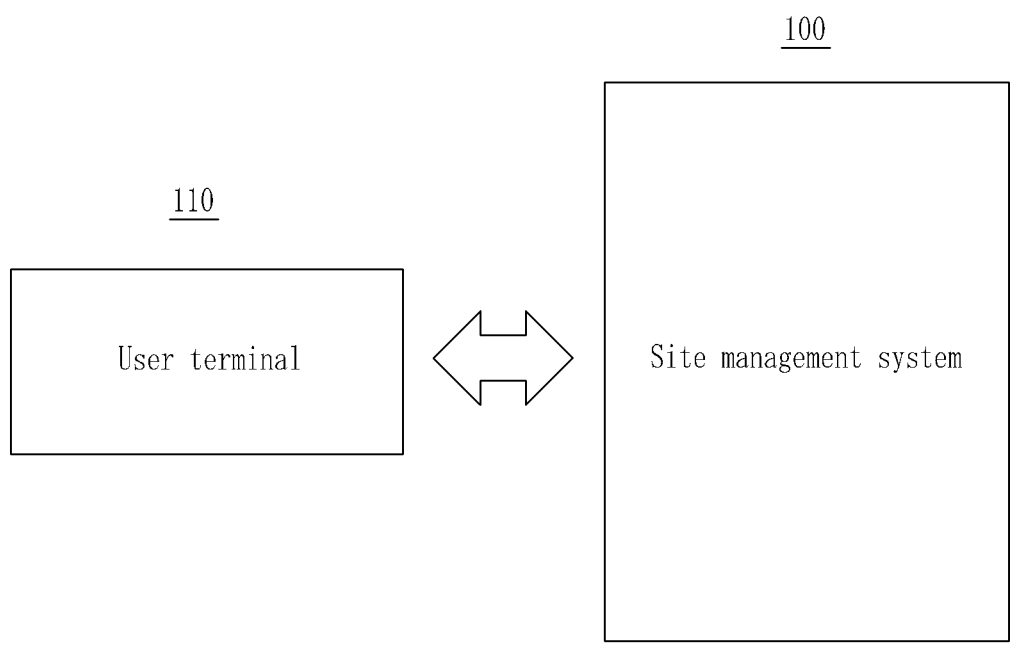
FIG. 1 illustrates an example of a relationship between a user terminal and a site management system according to an example embodiment.

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Example embodiments provide a site management system including a tool capable of supporting a user to easily and conveniently construct a website/mobile site.

FIG. 1 illustrates an example of an operation between a user terminal 110 and a site management system 100 according to one example embodiment.

The site management system 100 may be a server that supports a user to construct a website or a mobile site. Although an example of creating a mobile site is described hereinafter, it is only one example and thus, example embodiments may also be used to create a website in addition to the mobile site.

The user terminal 110 refers to any type of terminal devices that may receive a service of the site management system 100 by connecting to a website/mobile site associated with the site management system 100 over a network, for example, a personal computer (PC), a smartphone, and a tablet, or by installing and executing a service exclusive application. Here, the user terminal 110 may perform the overall service operation, such as a service screen configuration, a data input, a data transmission and reception, and data storage, under the control of the website/mobile site and the service exclusive application.

The site management system 100 may provide an authoring tool that enables a user, for example, a general user or an advertiser to create a mobile site. In particular, the site management system 100 may support a user to be capable of constructing the overall form of a desired website/mobile site and a detail form of components using a few clicks.

According to example embodiments, a single mobile site may include at least one mobile page. Individual mobile pages may be provided to a user in the form of a "card" in which a variety of functions are predefined. The cards may construct a single mobile site. At least two cards may be configured as a single page. Also, components constituting a card may be configuration units used to classify constituent elements required for a site creation based on at least one of a purpose and a function. For example, a text component may be a configuration unit used to display a text input from a user at a location of a corresponding component on a page. As another example, an image component may be a configuration unit used to display an image input from a user at a location of a corresponding component on a page. As another example, a map component may be a configuration unit used to display a map corresponding to a location selected by a user at a location of a corresponding component on a page.

Here, the site management system 100 may support a user to construct the form of a mobile site through an input or a selection of a simple condition by classifying and managing various cards based on various conditions and by randomly configuring and providing cards that satisfy a user condition. Hereinafter, a tool (hereinafter, referred to as a quick editor) for constructing the form of an individual mobile page will be described.

Figure 2:
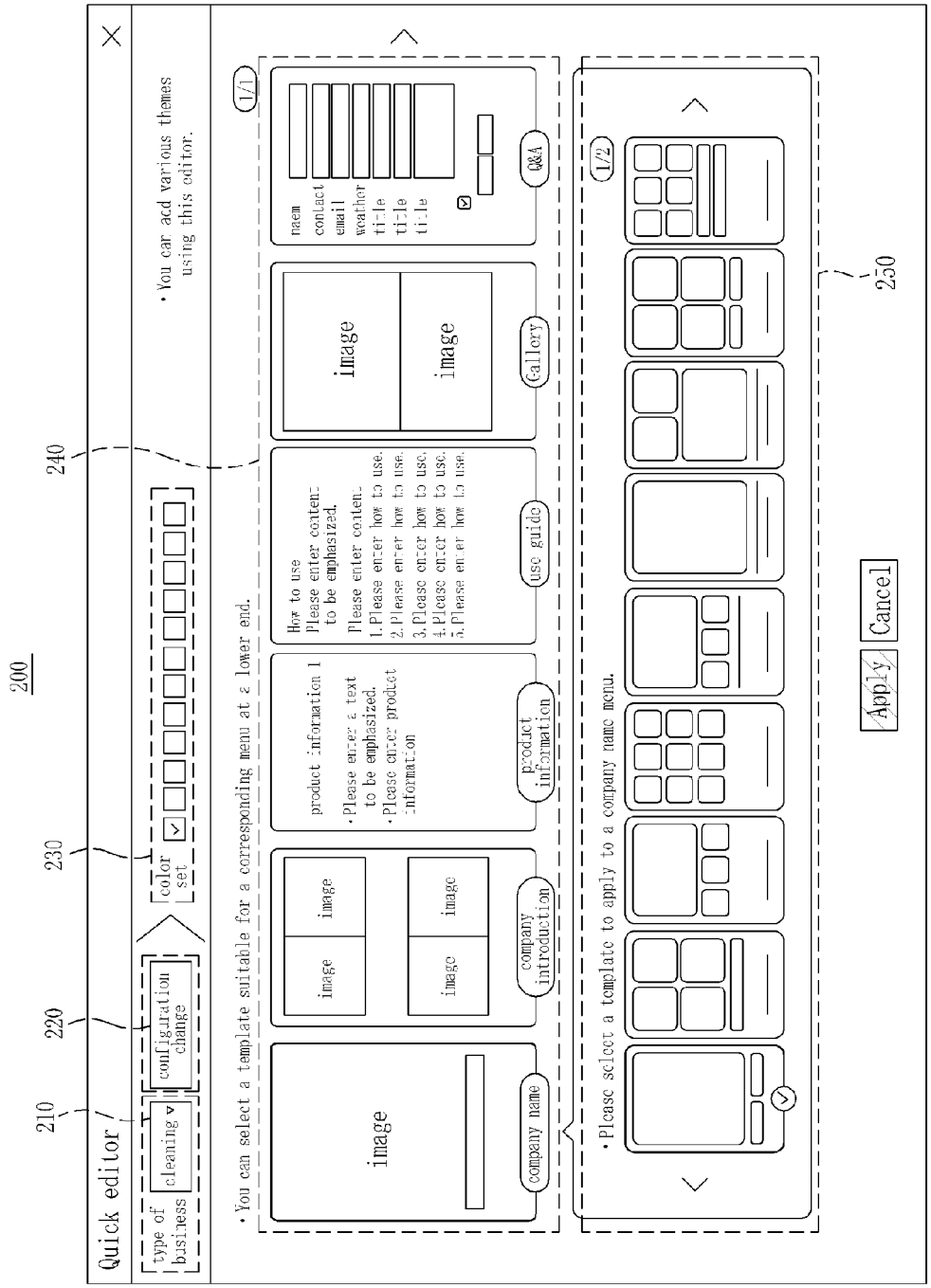
FIG. 2 illustrates an example of an execution screen of a quick editor according to an example embodiment.

FIG. 2 illustrates an example of an initial execution screen of a quick editor according to one example embodiment.

Referring to a first screen 200 of FIG. 2, a first box 210 indicated by dotted lines refers to a first user interface for selecting the type of business, a second box 220 indicated by dotted lines refers to a second user interface for changing the configuration of the cards, and a third box 230 indicated by dotted lines refers to a third user interface for changing the color tone of the cards.

A user may select a single type of business from among various types of businesses displayed through the first user interface. In this example, menus, for example, a "company name" menu, a "company introduction" menu, a "product information" menu, a "use guide" menu, a "gallery" menu, and a "Q&A" menu included in a fourth box 240 indicated by dotted lines, may be configured to be different for each type of business.

Also, the user may change a configuration of cards with respect to the selected type of business through the second user interface. For example, in response to a click of a user on a "configuration change" button displayed using the second user interface, cards corresponding to each menu may be changed randomly for each menu. The number of cards changeable for each menu may differ based on a type of business and/or a menu. For example, 11 changeable cards may be provided for the "company name" menu and two changeable cards may be provided for the "Q&A" menu.

Also, the user may change a color to be applied to cards through the third user interface. The color may be collectively applied to cards to which the color is applicable.

As described above, the term "card" may correspond to a single mobile page. A single menu may include at least one card. An example in which a single menu includes at least one card will be further described below.

The fourth box 240 shows an example in which a single card is displayed for each menu based on menus configured in advance in associated with the selected type of business "cleaning" When the user applies the displayed cards, each of six cards included in the fourth box 240 may represent the form of a single mobile page. The respective mobile pages may construct the form of a single mobile site. Each of the cards displayed through the fourth box 240 may be a thumbnail about the form of a mobile page. The thumbnail may be a sample image that represents the form of a card, for example, the form of a mobile page. Thumbnails illustrated in the drawings are sample images provided to the user in the form of a preview and thus, contents included in the thumbnails are insignificant to understand the example embodiments.

A fifth box 250 indicated by dotted lines refers to a thumbnail that represents applicable card templates in association with the "company name" menu currently selected as a default. When the user is to change a template, the card of a corresponding menu may be replaced with the card of the selected template. That is, the number of templates to be applicable to a predetermined menu may correspond to the number of cards changeable for the menu. Also, the terms "replace" and "change" may be interchangeably used throughout.

Based on a thumbnail representing the form of a card and a thumbnail of templates in which a combination of components is visualized, the user may easily verify and change the form of a desired mobile site and a form of mobile pages.

Figure 3:
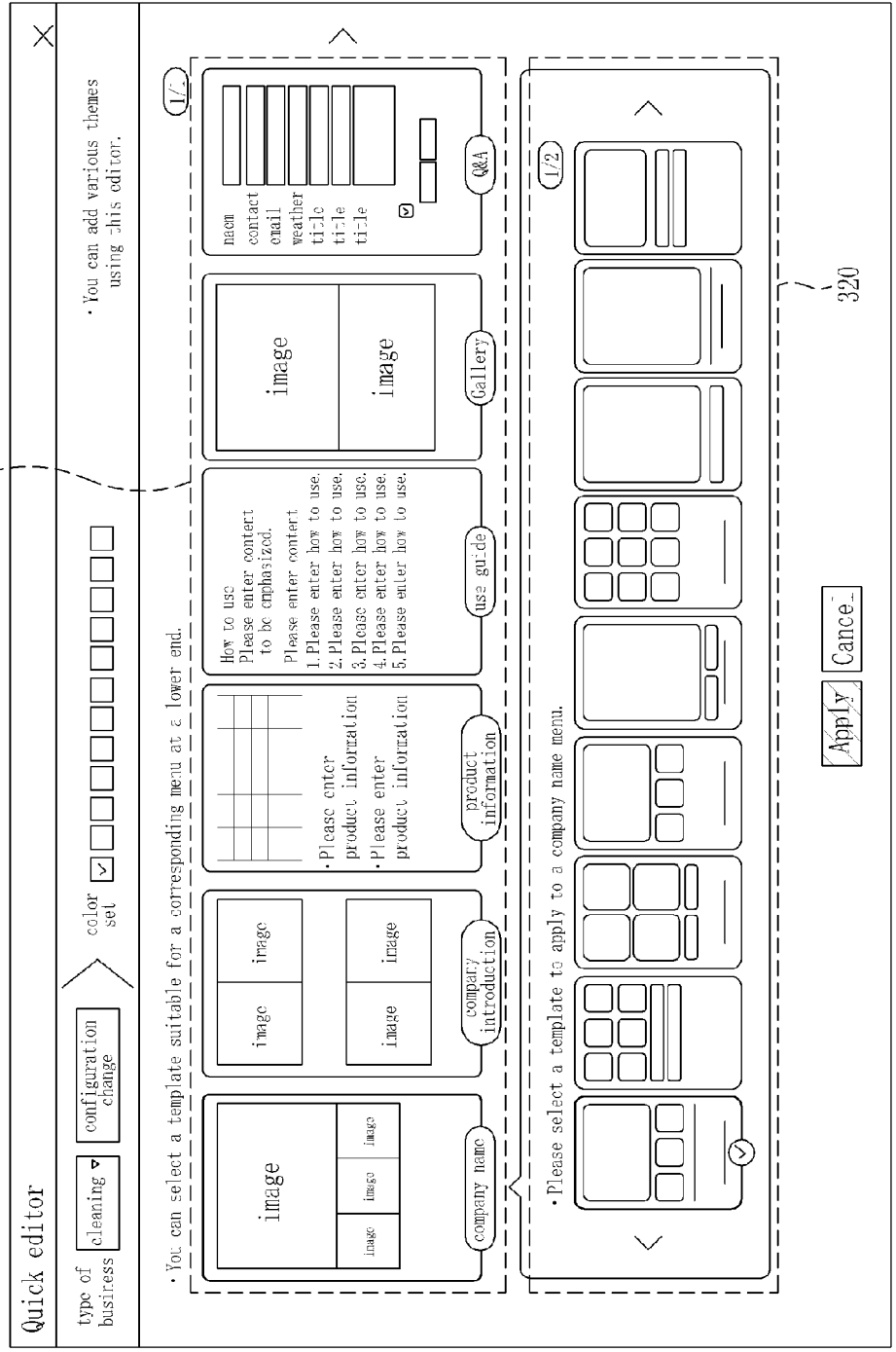
FIG. 3 illustrates an example of a screen on which a user has changed a configuration of cards according to an example embodiment.

FIG. 3 illustrates an example of a screen on which a user has changed the configuration of cards according to an example embodiment.

A second screen 300 of FIG. 3 shows an example in which the first screen 200 is replaced with the second screen 300 in response to a click of the user on the "configuration change" button displayed on the first screen 200 through the second user interface. For example, by comparing a sixth box 310, indicated by dotted lines, of the second screen 300 to the fourth box 240 of the first screen 200, it can be known that cards of the "company name" menu, and the "product information" menu are changed.

Here, a seventh box 320 indicated by dotted lines shows an example in which, in response to a replacement of a card corresponding to the "company name" menu, a template corresponding to the replaced card is replaced with the template of a card corresponding to a current "company name" menu.

As described above, the site management system 100 manages various menus, cards, and colors for each type of business, and provides a service so that a user may easily and conveniently construct the form of a desired mobile site, for example, the form of individual mobile pages by selecting a type of business, a card, and a color.

Figure 4:
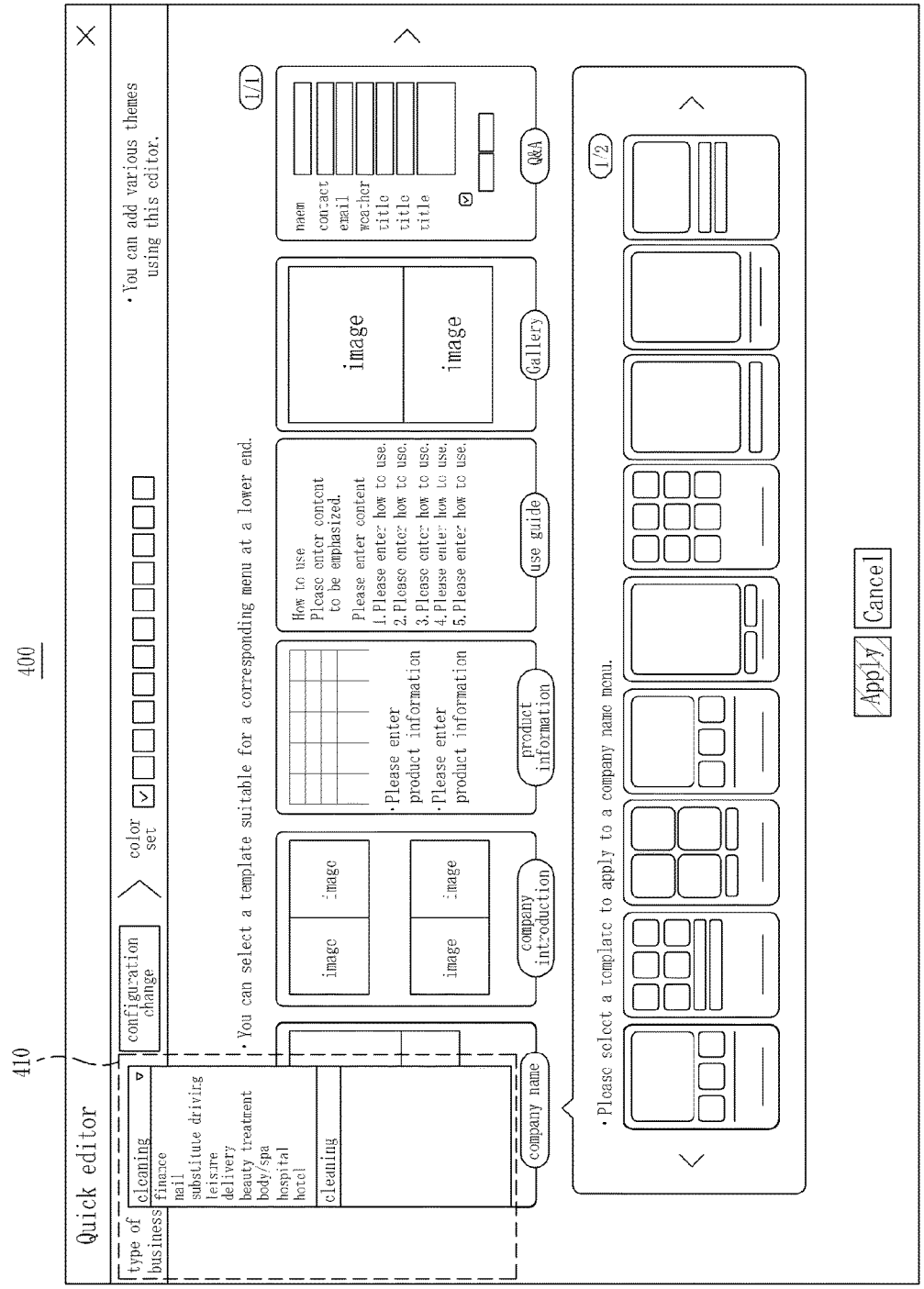
FIG. 4 illustrates an example of a screen on which a user selects a type of business according to an example embodiment.

FIG. 4 illustrates an example of a screen on which a user selects the type of business according to one example embodiment.

Referring to a third screen 400 of FIG. 4, an eighth box 410 indicated by dotted lines shows an example in which information, for example, "finance", "nail", and "substitute driving", on predefined various types of businesses is displayed through a first user interface that enables a user to select the desired type of business. The user may construct the form of a mobile site by selecting a single type of business from among the predefined types of businesses through the first user interface. Alternatively, the user may construct the form of a mobile site suitable for the type of business of the user alone through other types of businesses.

Figure 5:
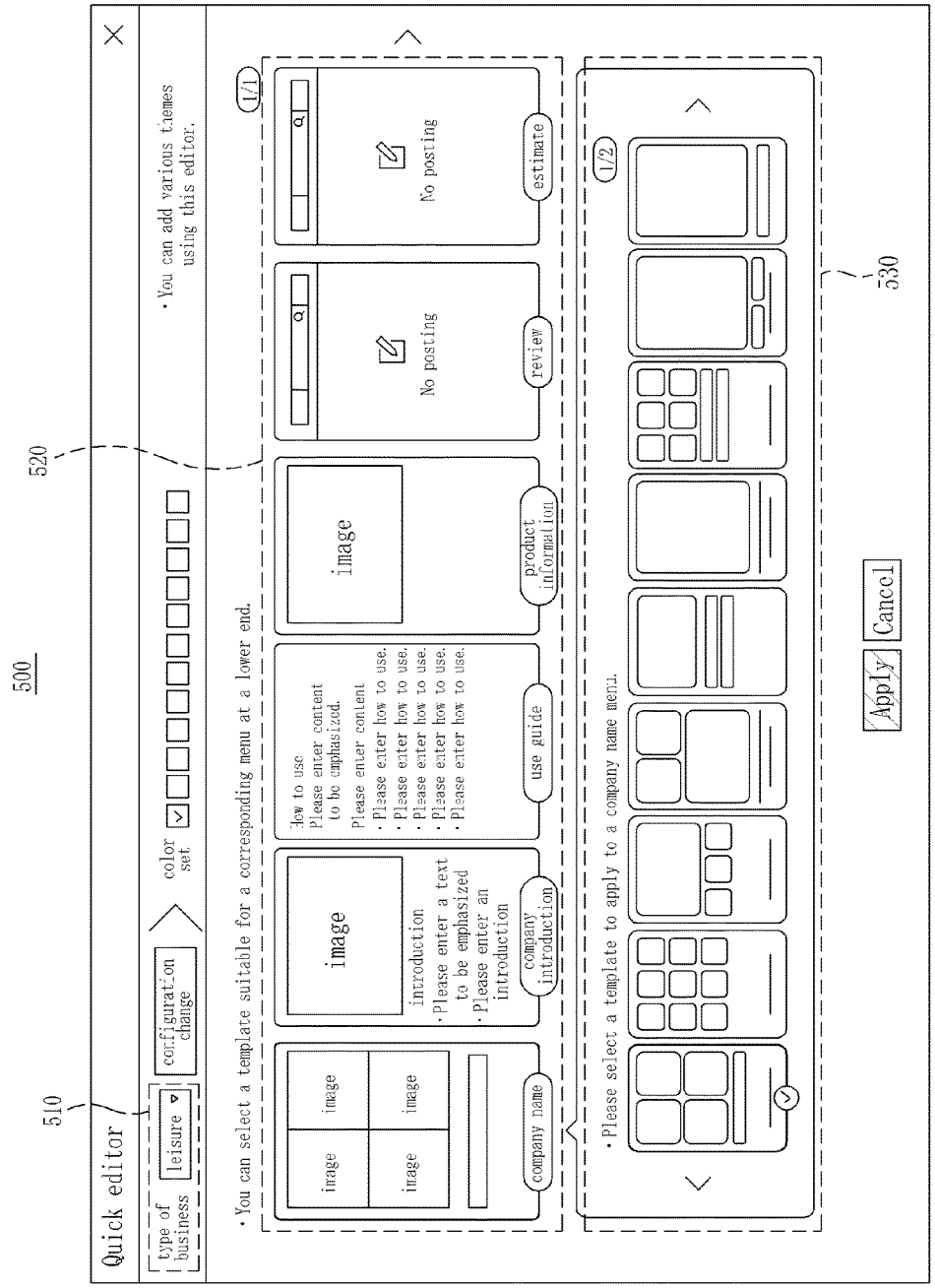
FIG. 5 illustrates an example of a screen on which a type of business is changed according to an example embodiment.

FIG. 5 illustrates an example of a screen on which a type of business is changed according to another example embodiment.

A fourth screen 500 of FIG. 5 shows an example in which the third screen 400 of FIG. 4 is replaced with the fourth screen 500 on which menus and cards corresponding to each menu are changed as illustrated in a ninth box 520 indicated by dotted lines in response to a selection of the user on the type of business "leisure". When the user is to change the configuration of the cards through the second user interface, a variety of cards applicable in association with menus of the type of business "leisure" may be displayed through the ninth box 520 in association with the menus.

Also, a tenth box 530 indicated by dotted lines shows the template of a card corresponding to the currently selected menu, for example, the "company name" menu and other templates or cards applicable to the currently selected menu.

As described above, the user may further easily construct a desired mobile site by changing the form of a mobile site and the form of mobile pages included in the mobile site with a few clicks for changing the type of business, the configuration, the color set, and the template.

In an example in which the site management system 100 predefines 20 types of businesses and 20 menus for each type of business, and provides one to eleven selectable cards, for example, templates for each menu and a total of 12 color sets, the number of combinations with respect to the form of a mobile site capable of being constructed by the user may be 4800 (=20*20*1*12) to 52800 (=20*20*11*12). However, it is only an example and thus, the form of a mobile site may be provided through further various combinations based on the number of types of businesses or the number of menus applicable, the number of cards for each menu, or the number of colors. For example, in response to an execution of the quick editor, cards may be randomly arranged and a card arrangement may be renewed every time the user clicks on the configuration change menu, so that the user may use a non-overlapping template.

In this example, templates, for example, cards may be randomly provided for each menu. However, when a user experience increases, the templates or the cards may be displayed in descending order of the number of user selections, for example, a user preference, instead of being randomly displayed. For example, a template having a relatively high user preference may be preferentially displayed and templates having the same user preference may be displayed in random order.

Examples of constructing the form of a mobile site and the form of individual mobile pages are described. Hereinafter, examples of editing actual contents of individual mobile pages will be described.

Figure 6:
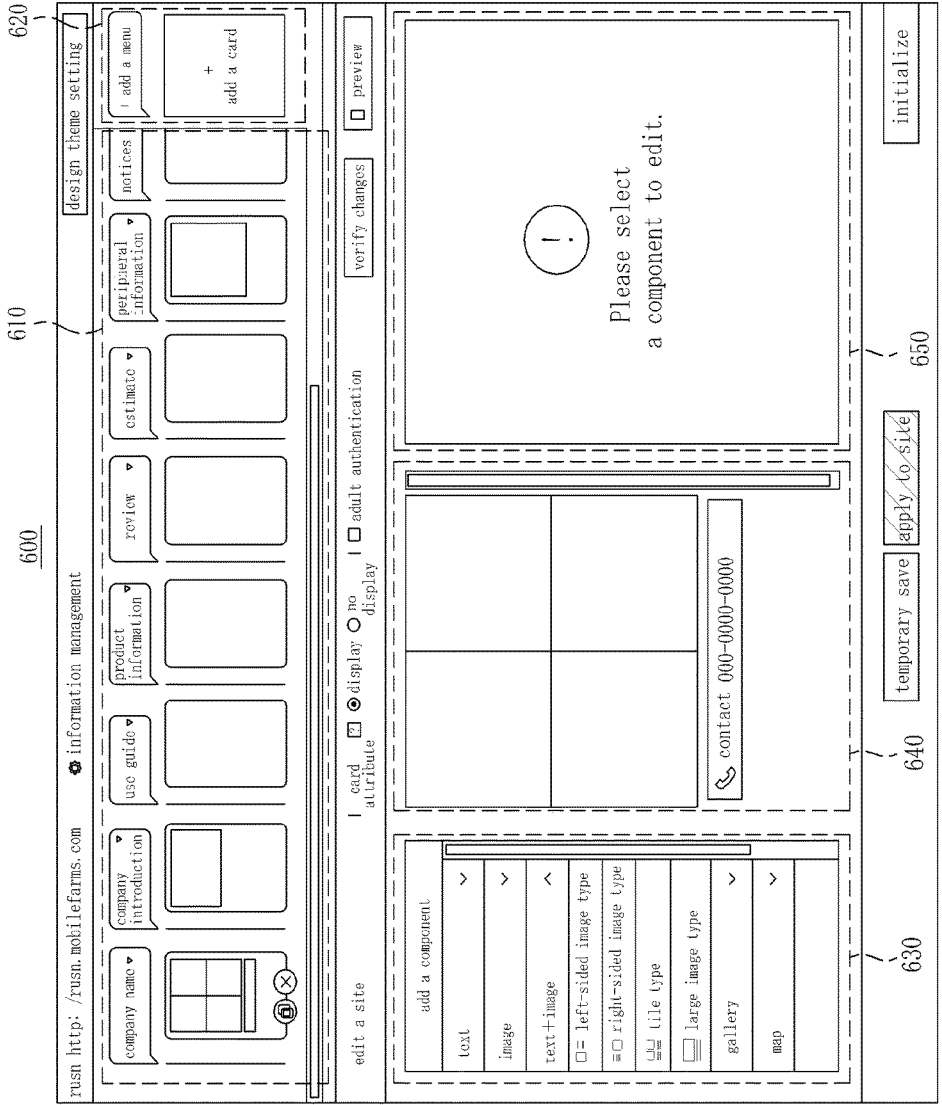
FIG. 6 illustrates an example of a screen for editing a site according to an example embodiment.

FIG. 6 illustrates an example of a screen for editing a site according to one example embodiment.

Referring to a fifth screen 600, an eleventh box 610 indicated by dotted lines refers to information about a menu and cards currently set at a mobile site. A fifth user interface for changing a menu name may be provided for each menu. A sixth user interface for adding or deleting a card may be provided for each card.

Also, a twelfth box 620 indicated by dotted lines refers to a seventh user interface for adding a separate menu or card.

Also, a thirteenth box 630 indicated by dotted lines refers to an eighth user interface for adding components to the currently selected card. For example, as illustrated in the thirteenth box 630, a component may include various upper components such as "text", "image", "image+text", "gallery", and "map", and various lower components such as "left-sided image type", "right-sided image type", "tile type", and "large image type" additionally displayed in response to a selection on an upper component. In response to a selection on a lower component, the selected lower component may be added to a card.

Also, a fourteenth box 640 indicated by dotted lines refers to a ninth user interface for providing a preview function of the currently selected card.

Also, a fifteenth box 650 indicated by dotted lines refers to a tenth user interface for providing a function capable of editing a component in response to the selection on the component among components displayed through the preview function.

Figure 7:
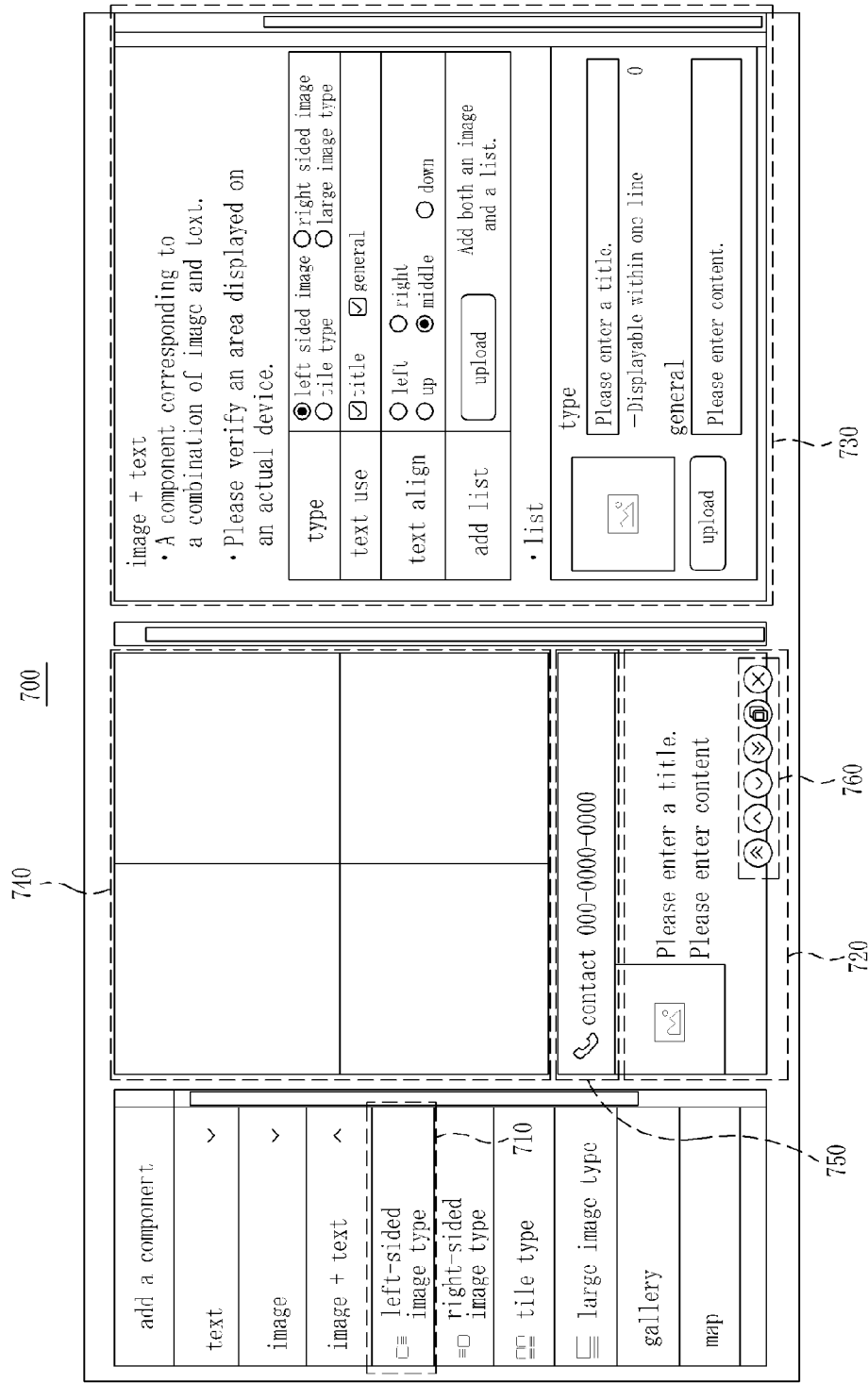
FIG. 7 illustrates an example of a screen for adding a component and editing the added component according to an example embodiment.

FIG. 7 illustrates an example of a screen for adding a component and editing the added component according to an example embodiment.

A sixth screen 700 shows an example in which a "left-sided image type" component is added as illustrated in a seventeenth box 720 indicated by dotted lines through the preview function of the ninth user interface, in response to a selection on the "left-sided image type" component displayed on a sixteenth box 710 indicated by dotted lines through the eighth user interface, and an eleventh user interface for editing an "image+text" component is displayed as illustrated in an eighteenth box 730 indicated by dotted lines. A user may input or select a text or an image desired to be displayed through the "left-sided image type" component added using the eleventh user interface displayed on the eighteenth box 730.

In this example, as illustrated in the seventeenth box 720, a component may be added in a downwardly stacking structure. For example, it can be seen that the "left-sided image type" component is added below a component displayed on a nineteenth box 740 indicated by dotted lines and a component displayed on a twentieth box 750 indicated by dotted lines. As described above, components may be added in a vertically stacking structure using a very simple use method. Accordingly, any user may easily add a component, and a user without having professional knowledge may create a mobile site.

Also, each component may include a twelfth user interface for moving, duplicating, or deleting a component as illustrated in a twenty-first box 760 indicated by dotted lines. Using the twelfth user interface, the user may easily change a location of a component within a single mobile page.

Figure 8:
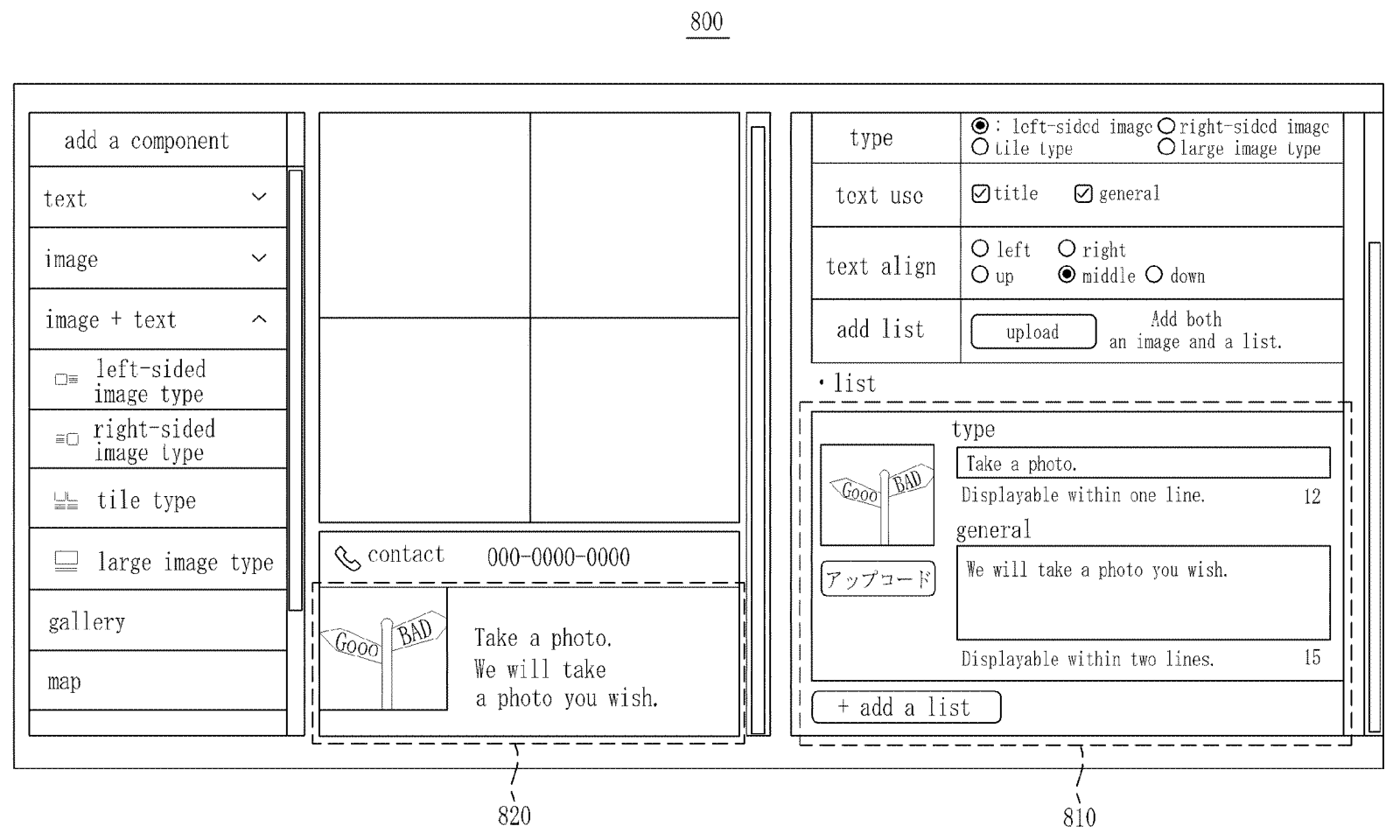

FIG. 8 illustrates an example of a screen for editing a component according to one example embodiment.

Referring to a seventh screen 800, a twenty-second box 810 indicated by dotted lines shows an example of registering a text and an image, and a twenty-third box 820 indicated by dotted lines shows an example of applying the registered text and image to a component.

A user may concisely edit mobile pages within a limited area by providing a function of adding a component through a "component add" area on the left (see the thirteenth box 630 of FIG. 6), by providing a function of selecting, moving, duplicating, or deleting a component through a "preview function" area on the center (see the fourteenth box 640 of FIG. 6), and by providing a function of inputting content into a selected component or editing the component through an edition area on the right (see the fifteenth box 650 of FIG. 6).

Also, with respect to a mobile page constructed based on a component unit, a search robot may easily verify and perform crawling on information having a relatively high importance by assigning an attribute, for example, a text, an image, a map, a gallery, a button, a table, and a moving picture, for each component, and by assigning an importance. For example, in the case of a component to which a text attribute is assigned, a relatively high importance may be assigned to the component according to an increase in a font size. When a text "hotel" with a font size of "16" and a text "package" with a font size of "14" are present on a single page, a relatively high importance may be assigned to the text "hotel" rather than the text "package". In this example, the level of importance may be used as a weight of a keyword to extract a representative keyword or an important keyword of the page or a site including the page. Alternatively, the level of importance may be used to extract a tag of the page. As another example, with respect to a component to which a text color attribute or an image attribute is assigned, an importance may be variously applied for each attribute, such as a size of an image, and may be used.

Also, a function of collectively changing content, changing a language, or applying a special effect may be provided with respect to a component to which a predetermined attribute, for example, a color, a font size, and a size/location of an image, is assigned. For example, when changing a language of a component having a "text" attribute from Korean to English, it is possible to easily change a mobile page in Korean to a mobile page in English. As another example, a collective change may be variously applicable to components having the same attribute, such as changing "left-sided image type" components to "right-sided image type" components.

Figure 9:
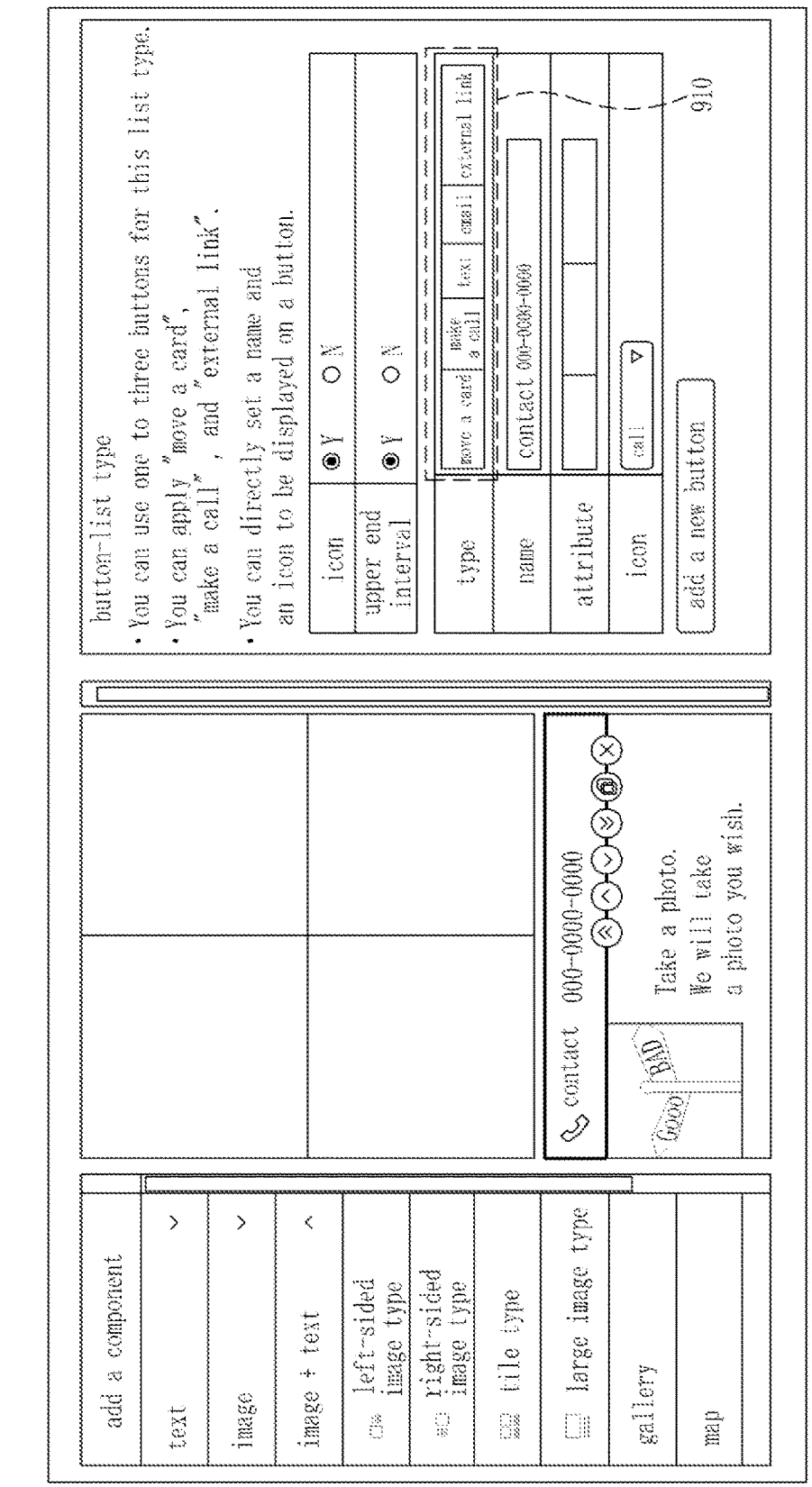
FIG. 9 illustrates an example of a screen for editing a button function according to an example embodiment.

FIG. 9 illustrates an example of a screen for editing a button function according to one example embodiment.

At a mobile site, functions available in a mobile environment may be included in a mobile page. Referring to an eighth screen 900, a twenty-fourth box 910 indicated by dotted lines refers to a thirteenth user interface for adding, to a predetermined component, various functions, for example, "move a card", "make a call", "text", "email", and "external link", available in a mobile environment.

A button displayed in response to "move a card" may provide a function that enables a connector provided with a corresponding mobile page to move from a card of a current component to a card of a predetermined attribute, for example, a "company name" card, a "company introduction" card, or an "address" card.

Also, a button displayed in response to "make a call" may provide a function of controlling a mobile terminal of a connector provided with a corresponding mobile page so that the connector may make a call at a preset telephone number through "make a call".

Also, a button displayed in response to "text" may provide a function of controlling a mobile terminal of a connector provided with a corresponding mobile page so that the connector may send a text using a preset email address through "email".

Also, a button displayed in response to "external link" may provide a function of controlling a mobile terminal of a connector provided with a corresponding mobile page so that the connector may connect to a page corresponding to a preset link through "external link".

Hereinafter, a card corresponding to a mobile page will be further described.

According to example embodiments, cards may be classified into a general card and a function card.

The general card refers to a card to which a degree of freedom is applied to enable various combinations of components on an empty card. The general card may have a relatively high degree of freedom. Thus, a user may easily change a card to a desired form or may readily input desired content.

The function card refers to a card that includes a special function to meet various requirements. The function card may be configured as an independent single page or a single component to be coupled with the general card based on a user selection. For example, a function card for schedule management may be configured as a schedule management page or as a component included in a management page. The use of the function card may be determined in response to a user request.

An example of the function card may include a bulletin board card, a read-form card, or an index card.

The bulletin board card may have a function that enables a user to receive a notification, when a connector that accesses a created mobile page using a mobile of the connector uploads a posting, and a function that enables the user to manage the posting in a mobile environment or a PC environment.

The read-form card may be a card that enables a user to receive, from a connector, predetermined information in a desired form. Using the read-form card, the user may receive and manage refined data.

FIG. 10 illustrates an example of a screen for editing a read-form card according to one example embodiment. A ninth screen 1000 shows an example of the read-form card that provides various functions that enable a user to receive, from a connector to a corresponding mobile page, information associated with the "name", the "contact", and the "email" of the connector, the "date" associated with a service desired by the user, or other information in the form desired by the user.

The index card may be a card capable of constructing an index page of a mobile site based on an image of a predetermined card, and may provide a function that enables a user to drag an image of a basic size and set the image to be a size for displaying on an index page.

Figure 11:
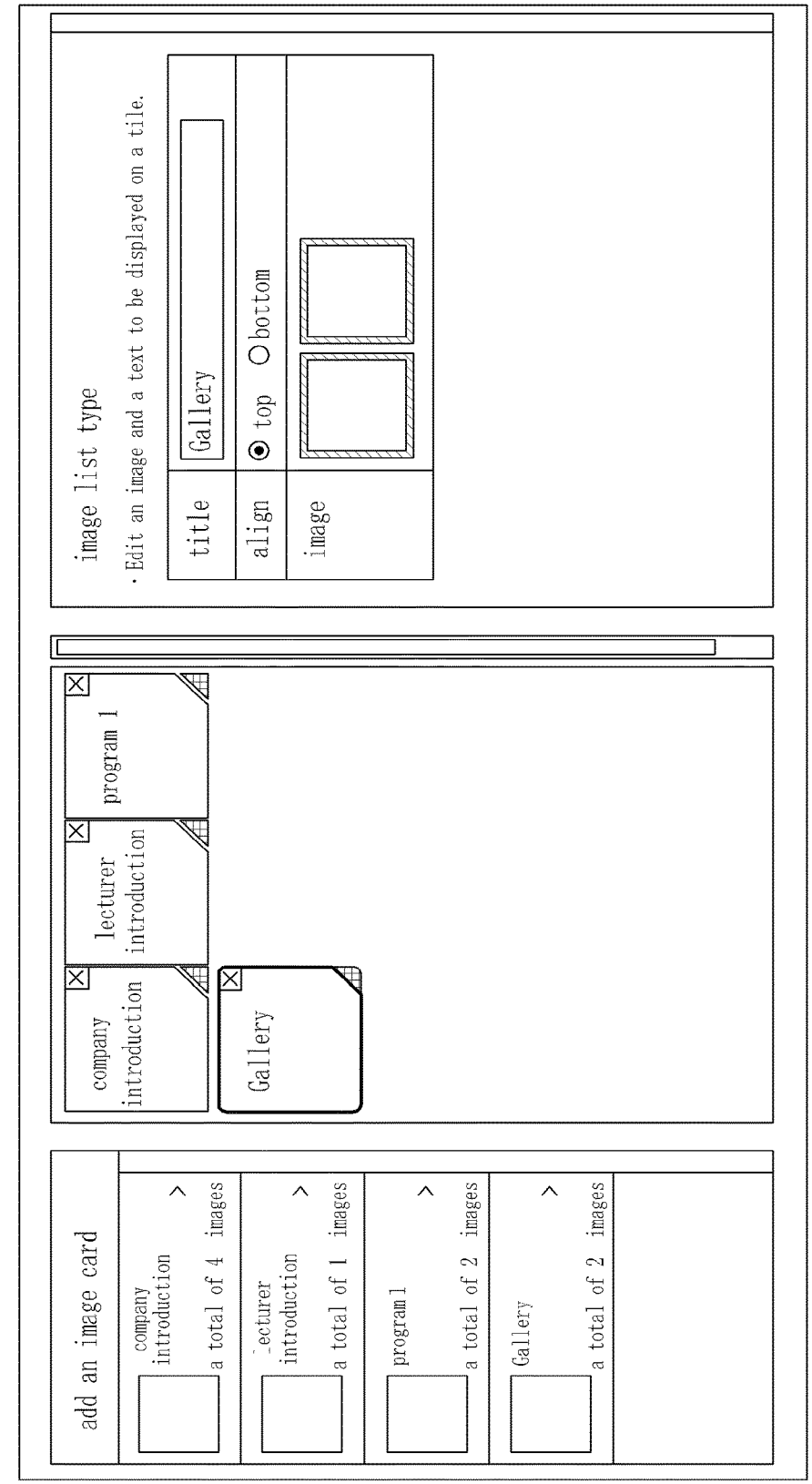
FIG. 11 illustrates an example of a screen on which images of other cards are arranged on an index card according to one example embodiment.
Figure 12:
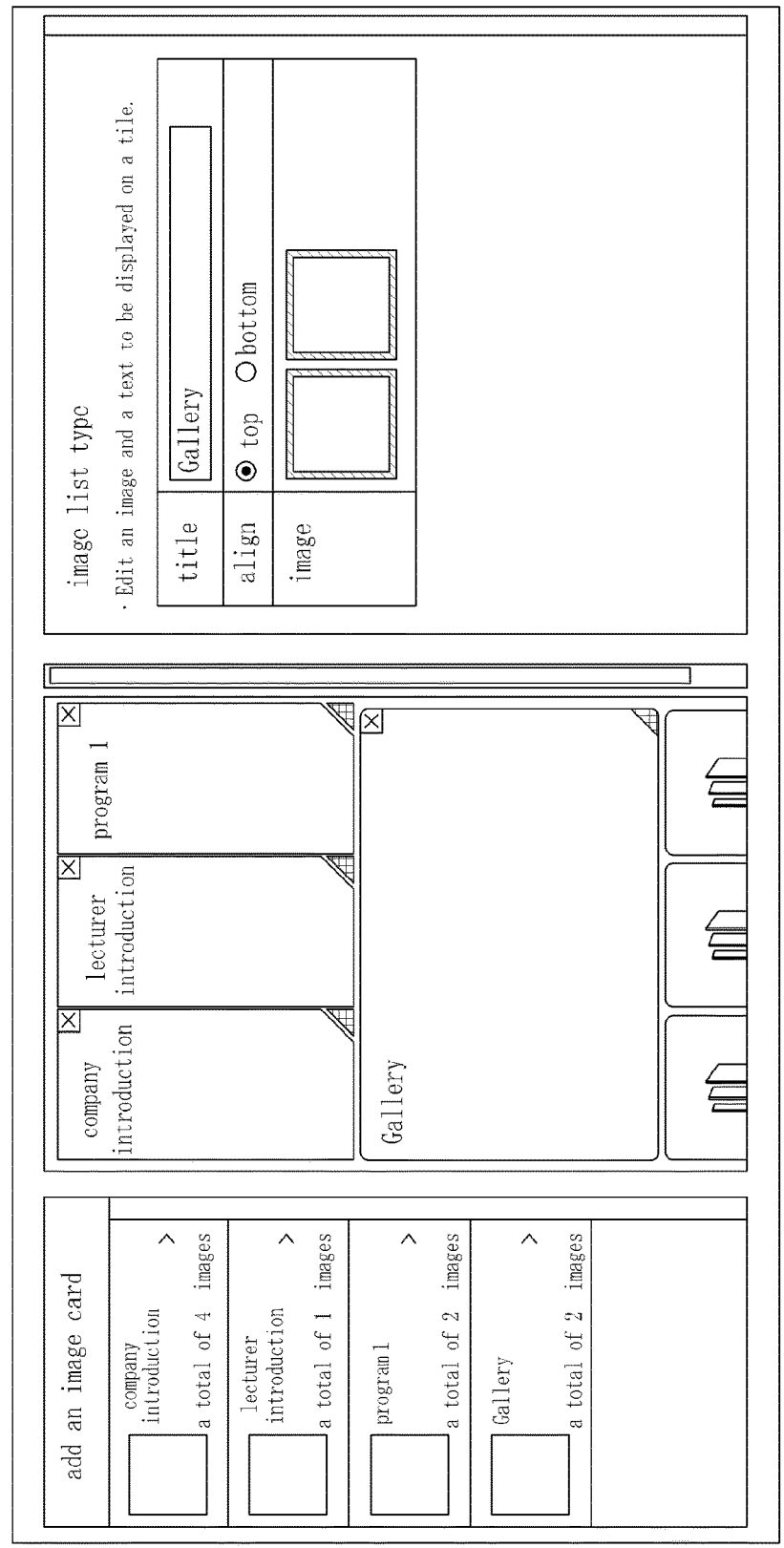
FIG. 12 illustrates the changing of the location and the size of an image by dragging the image according to an example embodiment.

FIG. 11 illustrates an example of a screen on which images of other cards are arranged on an index card according to an example embodiment, and FIG. 12 illustrates the changing of the location and the size of an image by dragging the image according to one example embodiment.

A tenth screen 1100 refers to an index card edition screen on which indices capable of moving to the respective cards are displayed using an image of a card corresponding to a "company introduction" menu, an image of a card corresponding to a "lecturer introduction" menu, an image of a card corresponding to a "program 1" menu, and an image of a card corresponding to a "gallery" menu.

Referring to an eleventh screen 1200 of FIG. 12, a user may change the size and the location of an image by dragging the image.

In addition, an available function card may include any type of cards required at a mobile site, for example, cards "game", "reservation-inventory management", "schedule management", "diary", and "housekeeping book". The function card may be created to have a variety of functions, registered to the site management system 100, and provided to users.

Meanwhile, the function card may be autonomously created and provided by the site management system 100. Also, the function card may be developed based on a module unit by a third party, for example, an outside developer or a user, and be registered with the site management system 100.

The aforementioned general card and/or function card may be used as a revenue model of the site management system 100.

According to one example embodiment, the site management system 100 may charge a user based on at least one of the number of function cards used for a site creation and the type of a function card. For example, a fee may be set for each function card. The user may be charged with a fee associated with a site creation based on a function card and the number of function cards used for the site creation.

According to another example embodiment, the site management system 100 may charge a user based on the number of times that a function card used for a site creation is executed by a site visitor. For example, when a site is created and exposed, visitors may visit the site. Here, when the visitors use a function of the function card at the site, the number of times that the function of the function card is executed may be counted by the site management system 100. A user may be charged with cost preset for a function execution and a fee determined based on the number of function executions. Here, the cost preset for the function execution may vary for each function of the function card.

According to yet another example embodiment, the site management system 100 may sell a function card to a user at predetermined cost. That is, the user may create a site using the purchased function card. For example, when providing cards to a user, all the types of general cards and a function card purchased by the user may be provided to the user. Here, the cost for selling and purchasing a function card may vary for each function card.

According to still another example embodiment, the site management system 100 may sell a combination of cards to a user. For example, a combination of cards may include general cards only, may include function cards only, or may include a combination of a general card and a function card.

According to further example embodiment, when providing a combination of cards to a user, the site management system 100 may charge the user using a variety of methods, for example, charging the user for using a predetermined card among the coupled cards or charging the user for executing a function of a function card among the coupled cards.

When a card is created by a third party, for example, an outside developer or a user, revenues created by the card may be distributed to the third party.

Although examples of classifying a site based on the type of business are described, it is only an example. That is, the type of business is only an example of a "category" to classify a site and thus, various contents types, for example, music, movie, dictionary, and real estate, as well as the type of business may be included in a category.

Figure 13:
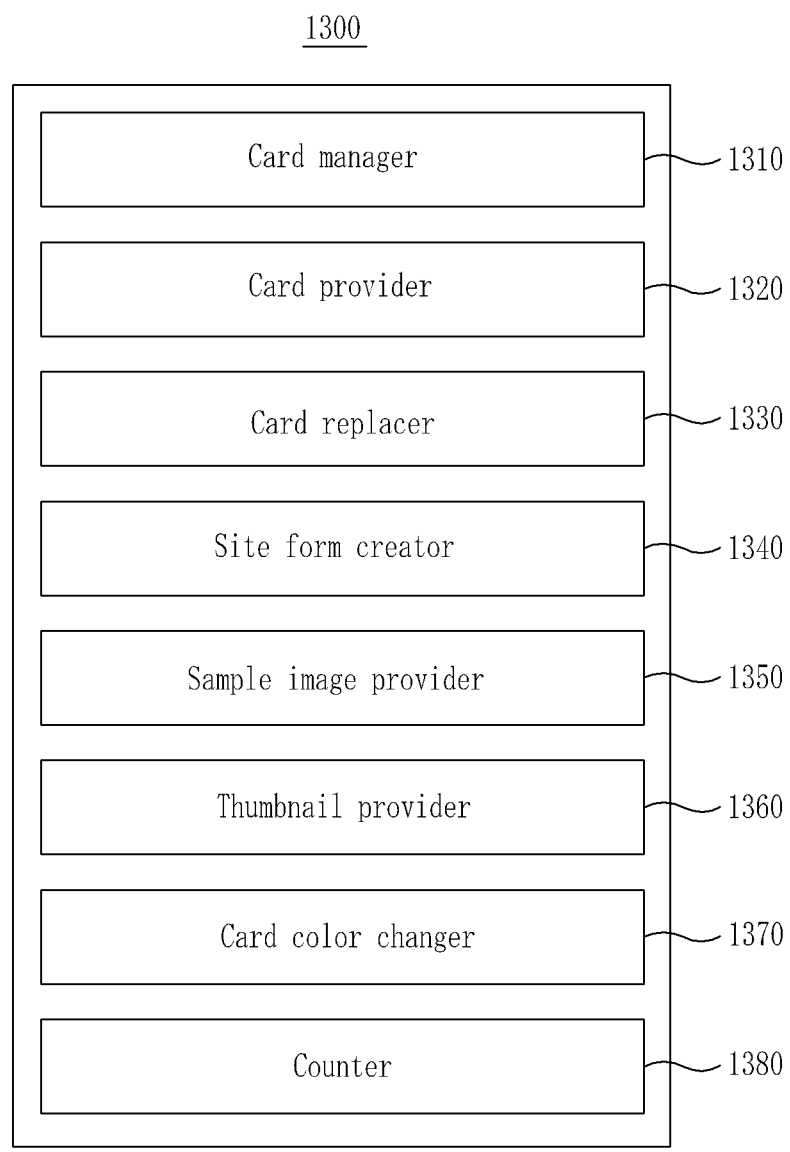
FIG. 13 is a block diagram illustrating the configuration of a site management system according to an example embodiment.
Figure 14:
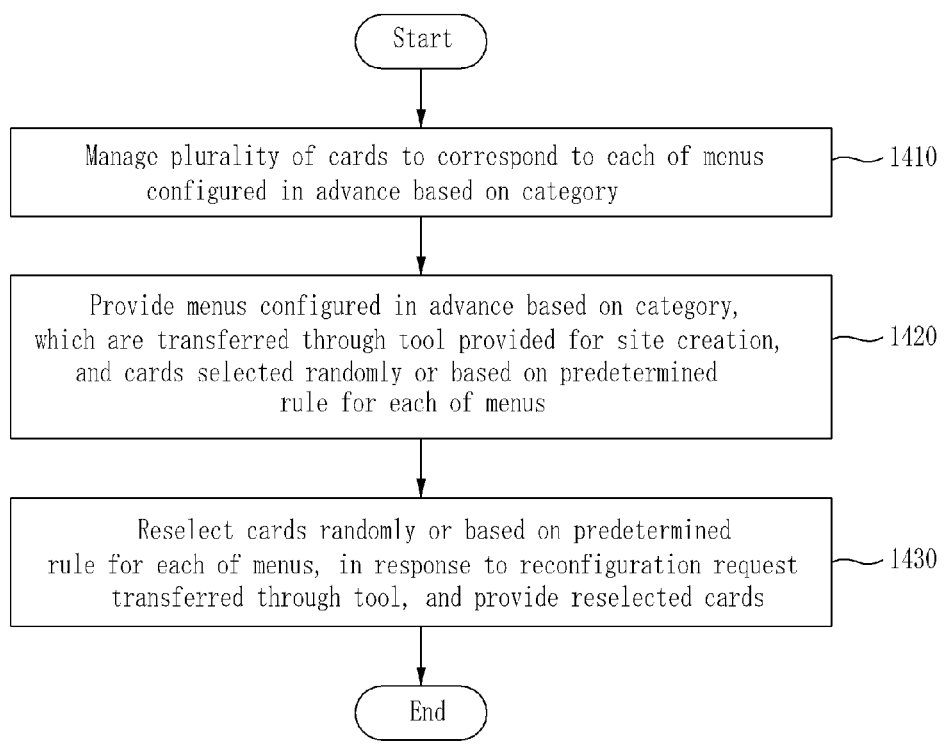
FIG. 14 is a flowchart illustrating a site management method according to one example embodiment.

FIG. 13 is a block diagram illustrating the configuration of a site management system 1300 according to one example embodiment, and FIG. 14 is a flowchart illustrating a site management method according to an example embodiment. Referring to FIG. 13, the site management system 1300 includes a card manager 1310, a card provider 1320, and a card replacer 1330, and depending on necessity, may further include a site form creator 1340, a sample image provider 1350, a thumbnail provider 1360, a card color changer 1370, and a counter 1380. The site management method of FIG. 14 may be performed by the site management system 1300 or by constituent elements included in the site management system 1300.

In operation 1410, the card manager 1310 manages a plurality of cards to correspond to each of menus configured in advance based on category. Here, the plurality of cards corresponding to each menu may have different template structures. An example of managing menus and cards for each type of business by employing the type of business as a category is described above.

In operation 1420, the card provider 1320 provides the menus configured in advance based on the category, which are transferred through a tool provided for a site creation, and cards selected randomly or based on a predetermined rule for each of the menus. An example of providing menus for each type of business and cards for each menu by employing a quick editor as the tool provided for the site creation is described above. Such tool may be provided to a user in the form of a web page/mobile page or in the form of an exclusive application.

In operation 1430, the card replacer 1330 reselects cards randomly or based on a predetermined rule for each of the menus, in response to a reconfiguration request transferred through the tool, and provides the reselected cards. In an example in which cards a, b, c, d, and e correspond to menu A and the card c is selected and provided with respect to the menu A in operation 1420, the card replacer 1330 may reselect a card corresponding to the menu A from among the cards a, b, c, d, and e randomly or based on the rule and may provide the reselected card.

According to one example embodiments, in addition to operations 1410 through 1430, the site management method may further include an operation (not shown) of creating a form of a site that includes menus as menus of the site and include cards as pages, in response to an application request transferred through the tool. The operation may be performed by the site form creator 1340. An edition such as adding content to pages of the site may be performed for each menu, each card, and each component included in a card after the form of the site is created.

According to another example embodiment, in addition to operations 1410 through 1430, the site management method may further include an operation (not shown) of providing sample images corresponding to the selected cards or the reselected cards. The operation may be performed by the sample image provider 1350. For example, the fourth box 240 of FIG. 2 shows an example in which sample images are provided to correspond to menus, for example, a "company name" menu and a "company introduction" menu for each type of business.

According to yet another example embodiment, in addition to operations 1410 through 1430, the site management method may further include an operation (not shown) of providing thumbnails about template structures of cards corresponding to a menu selected from among the menus through the tool. The operation may be performed by the thumbnail provider 1360. In this embodiment, a card corresponding to the selected menu may be replaced based on a thumbnail selected from among the provided thumbnails through the tool. For example, the fifth box 250 of FIG. 2 shows an example in which a card of a first template structure corresponds to a "company name" menu. In this example, when the user selects a thumbnail of a second template structure, a card of a second template structure may be used as the card corresponding to the "company name" menu.

According to still another example embodiment, in addition to operations 1410 through 1430, the site management method may further include an operation (not shown) of collectively replacing cards for each of the menus with cards in color corresponding to a color change request, in response to the color change request transferred through the tool, and providing the menus in which the cards are replaced. The operation may be performed by the card color changer 1370.

According to further example embodiment, in addition to operations 1410 through 1430, the site management method may further include an operation (not shown) of counting the number of times that each of the cards is selected for a site creation, based on at least one of category and menu. The operation may be performed by the counter 1380. Here, the cards may be selected for each of the menus by applying a user preference to a template structure that is calculated based on the counted number of times. For example, the card provider 1320 or the card replacer 1330 may select a card to be provided based on user preference.

Figure 15:
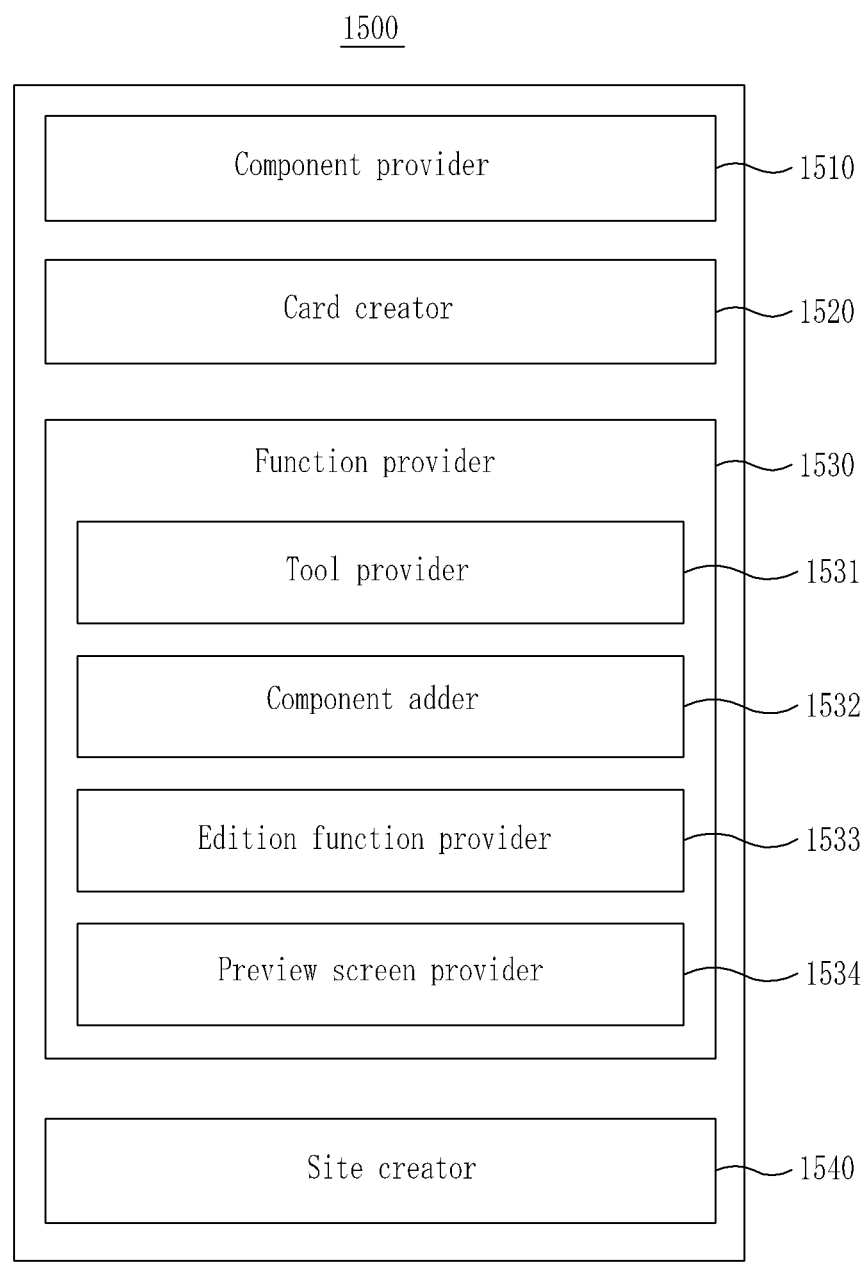
FIG. 15 is a block diagram illustrating another example of the configuration of the site management system according to one example embodiment.
Figure 16:
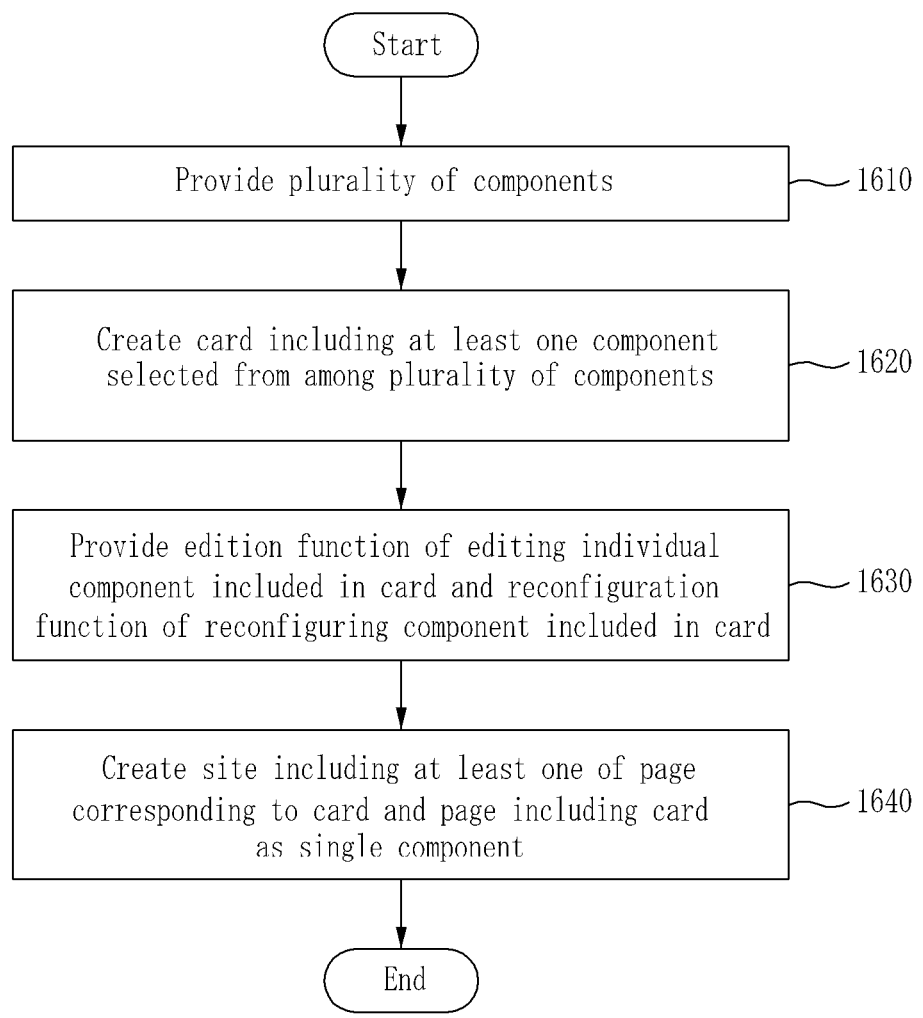
FIG. 16 is a flowchart illustrating another example of the site management method according to an example embodiment.

FIG. 15 is a block diagram illustrating the configuration of a site management system 1500 according to an example embodiment, and FIG. 16 is a flowchart illustrating a site management method according to an example embodiment. Referring to FIG. 15, the site management system 1500 includes a component provider 1510, a card creator 1520, a function provider 1530, and a site creator 1540. The site management method of FIG. 16 may be performed by the site management system 1500 or by constituent elements included in the site management system 1500.

In operation 1610, the component provider 1510 provides a plurality of components. As described above, the term "component" may be a configuration unit used to classify constituent elements required for a site creation based on at least one of purpose and function.

In operation 1620, the card creator 1520 creates a card including at least one component selected from among the plurality of components. For example, for a site creation, a user may arrange components suitable for a desired purpose or function. The card creator 1520 may create a card including the components.

In operation 1630, the function provider 1530 provides an edition function of editing an individual component included in the card and a reconfiguration function of reconfiguring a component included in the card. The edition function and the reconfiguration function are described above with reference to FIGS. 6 through 12.

In operation 1640, the site creator 1540 creates a site including at least one of a page corresponding to the card and a page including the card as a single component. For example, a uniform resource locator (URL) may be set for each of a site and pages included in the site. Through the set URL, an external connection to the site or each of the pages is enabled.

Depending on necessity, the function provider 1530 may selectively include a tool provider 1531, a component adder 1532, an edition function provider 1533, and a preview screen provider 1534. Operations included in operation 1630 may be performed by the tool provider 1531, the component adder 1532, the edition function provider 1533, and the preview screen provider 1534.

The tool provider 1531 may provide a tool that includes a component selection area, a preview area, and an attribute edition area to a terminal of the user over a network. The component selection area, the preview area, and the attribute edition area are described above with reference to FIGS. 6 through 12.

The component adder 1532 may add, to a card selected through the tool, a component selected through the component selection area in order from upward to downward of the selected card. Here, a width of the component may correspond to a width of the card. The width of the component may relate to providing components in a vertically stacking structure from upward to downward of the card.

The edition function provider 1533 may provide a user interface for editing a component selected from the preview area through the attribute edition area. The attribute edition area is also described above by referring to an example of inputting, into a component, content such as a text and an image.

When a component is added or edited, the preview screen provider 1534 may provide a preview screen of a card including the added or edited component through the preview area. The preview area may include a user interface for changing the orders of components included in the card.

By configuring a card with a combination of components, the importance may be assigned for each attribute assigned for each component. A card may correspond to a page or a component included in the page. When performing crawling at a site using a search robot, the importance may be applied as the importance of information included in the page. An example of assigning and using the importance is described above.

Figure 17:
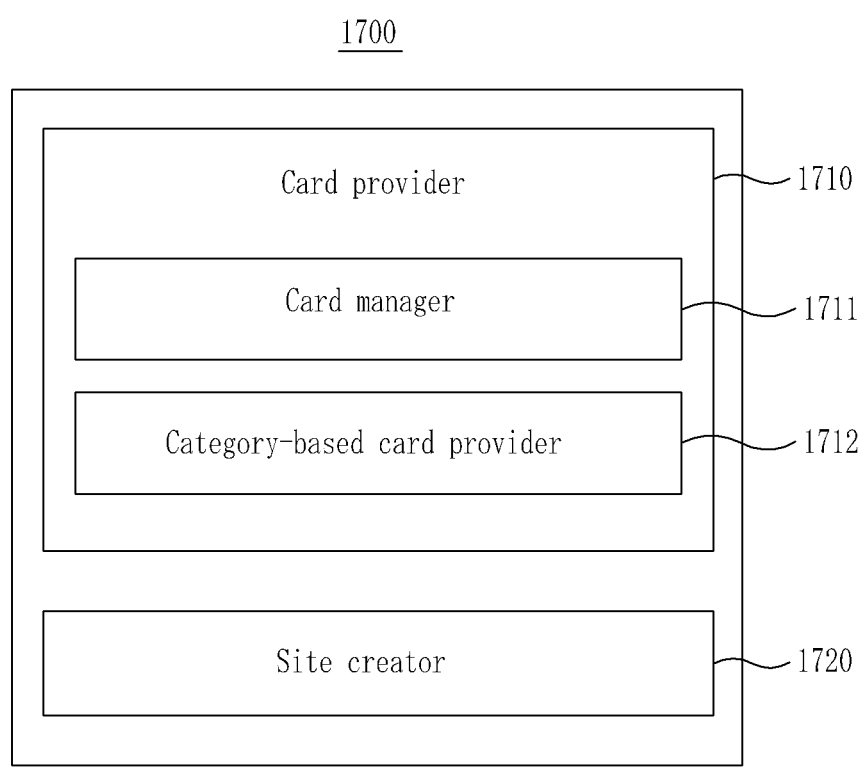
FIG. 17 is a block diagram illustrating still another example of the configuration of the site management system according to the present invention.
Figure 18:
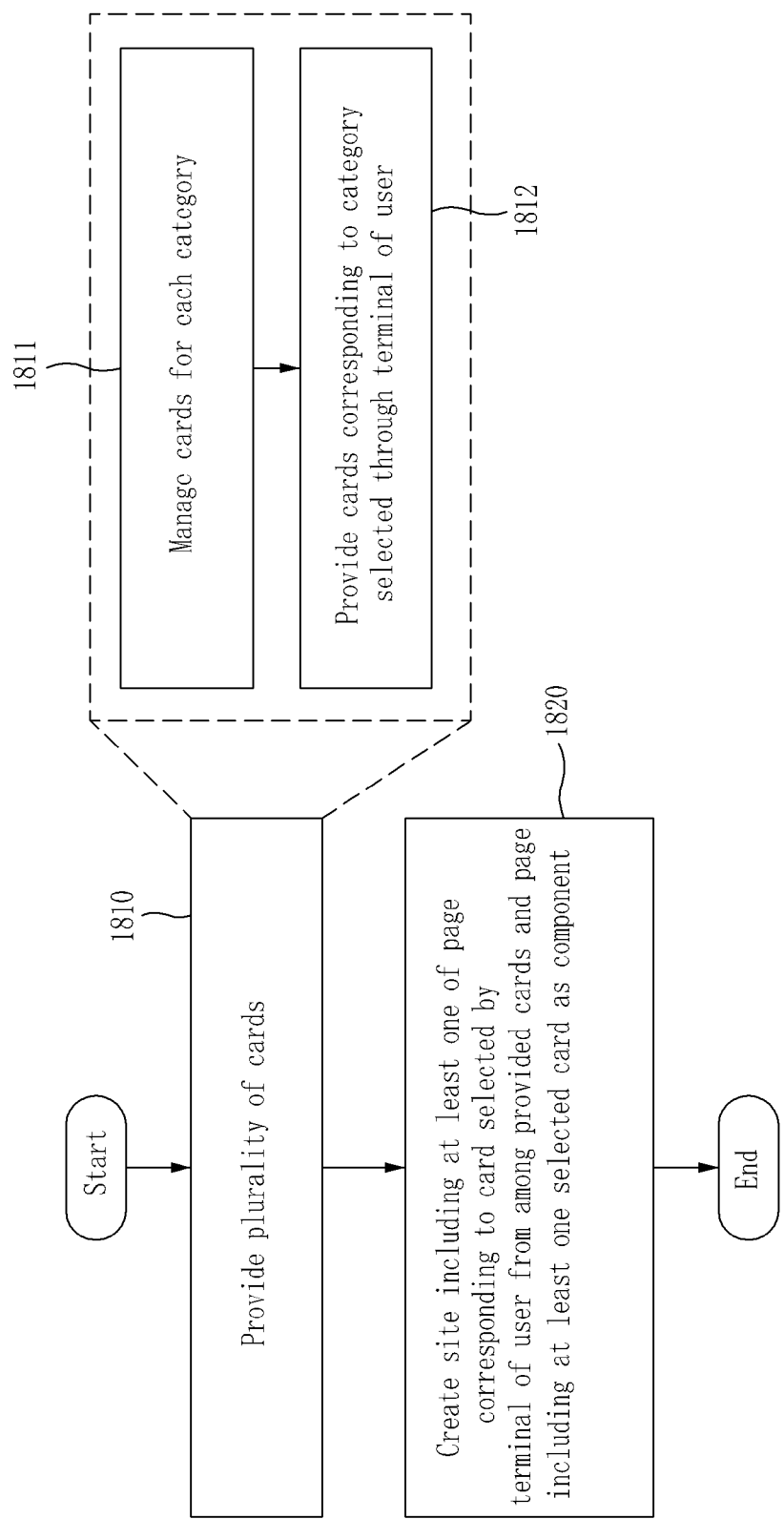
FIG. 18 is a flowchart illustrating still another example of the site management method according to the present invention.

FIG. 17 is a block diagram illustrating the configuration of a site management system 1700 according to another example embodiment, and FIG. 18 is a flowchart illustrating still another site management method according to an example embodiment. Referring to FIG. 17, the site management system 1700 may include a card provider 1710 and a site creator 1720. Depending on necessity, the card provider 1710 may selectively include a card manager 1711 and a category-based card provider 1712. The site management method of FIG. 18 may be performed by the site management system 1700 or constituent elements included in the site management system 1700.

In operation 1810, the card provider 1710 provides a plurality of cards. The plurality of cards may correspond to pages included in a site or components included in the pages. The plurality of cards may be classified into a general card configured through a selection and a combination of components by a user and a function card of which a function and a structure are predetermined.

As described above, components may be configuration units used to classify constituent elements required for a site creation based on at least one of a purpose and a function.

The general card may be configured by combining components selected by a terminal of the user from among components provided based on at least one of the category of a site and the menu of a page. For example, the site management system 1700 may provide a user with components selected based on at least one of the category of a site and the menu of a page in association with a single general card. Here, the user may configure a single general card by selecting and combining components.

The function card may include a function card that is autonomously created to have a special function and thereby provided and a function card that is created and registered by an outside developer to have a special function.

Also, the function card may be configured as a single independent page or as a single component to be coupled with the general card, based on a user selection.

Depending on example embodiments, operation 1810 may selectively include operations 1811 and 1812.

In operation 1811, the card manager 1711 may manage cards for each category used to classify created sites.

In operation 1812, the category-based card provider 1712 may provide cards corresponding to a category selected through the terminal of the user.

In operation 1820, the site creator 1720 may create a site including at least one of a page corresponding to a card selected by the terminal of the user from among the provided cards and a page including at least one selected card as a component. A portion of the cards may be configured as a single page included in the site. However, as described above, a card, particularly, a function card may be configured as a component included in a single general card.

As described above, function cards may be used as a revenue model of the site management system 100.

According to one example embodiment, the site management method may further include an operation (not shown) of charging a user based on at least one of the number of function cards and the type of a card used for a site creation. For example, a fee for using a function card may be preset for each function card. Here, the user may be charged with a fee for a site creation based on a function card used for the site creation or the number of function cards used for the site creation. The operation may be performed by the site management system 1700.

According to another example embodiment, the site management method may further include an operation (not shown) of charging a user based on the number of times that a function of a function card used for a site creation is executed by a site visitor. For example, when a site is created and exposed, visitors may visit the site. Here, when the visitors use a function of a function card at the site, the number of times that the function of the function card is executed by the site management system 1700 or a charger (not shown) of the site management system 1700 may be counted. The user may be charged with cost preset based on a function execution and a fee determined based on the number of function executions. Here, the cost preset based on the function execution may vary for each function of the function card. The operation may be performed by the charger that may be further included in the site management system 1700.

According to an example embodiment, the site management method may further include an operation (not shown) of selling a function card to a user at predetermined cost. That is, the user may create a site using the purchased function card. For example, when providing cards to a user, all the types of general cards and a function card purchased by the user may be provided to the user. Here, cost for selling and purchasing a function card may vary for each function card. The operation may be performed by a function card seller (not shown) that may be further included in the site management system 1700.

According to yet another example embodiment, a URL including additional information of a card may be assigned to each of at least two cards among a plurality of cards. For example, a user may create a site as expressed by the following Table 1.

TABLE 1

| Keyword | Landing site | Additional information | URL |
|---------|--------------|------------------------|-----|
| interior | www.interior.co.kr | price | www.interior.co.kr/price |
| | | location | www.interior.co.kr/location |
| | | portfolio | www.interior.co.kr/portfolio |
| | | review | www.interior.co.kr/review |

Table 1 shows an example in which landing site "www.interior.co.kr" including four cards in association with keyword "interior" is created. Here, the four cards included in the landing site are associated with additional information "price", "location", "portfolio", and "review", respectively. A URL including such additional information may be allocated to each card.

In this case, the site management method may provide a function that enables a user to verify or duplicate the URL allocated to the corresponding card on a screen for editing each card.

According to further example embodiment, the site management method may include an operation (not shown) of receiving a keyword through a terminal of a connector and an operation (not shown) of providing a card of a URL including additional information associated with the keyword to the terminal of the connector as a landing page. For example, in response to the connector attempting a search by inputting, into a search window, a keyword, for example, "interior price", "cheap interior", "interior price information", and "money saving interior", associated with an interior price, a card corresponding to URL "www.interior.co.kr/price" may be provided to the terminal of the connector as the landing page. As another example, in response to a keyword associated with an interior review being received from a connector, a card corresponding to URL "www.interior.co.kr/review" may be provided to the terminal of the connector as the landing page.

That is, a page to be initially displayed for a connector on a landing site may vary based on a keyword used by the connector to connect to the landing site.

The operations may be performed by a keyword receiver (not shown) and a page provider (not shown) that may be further included in the site management system 1700.

As described above, according to example embodiments, it is possible to support a user to be capable of constructing the overall form of a desired website/mobile site and a form of detail components using a few clicks.

Also, according to example embodiments, it is possible to provide a user with individual web pages/mobile pages to be included in a website/mobile site in a form of a card in which a variety of functions are predefined, and to support the user to create the website/mobile site through a selection and combination of provided cards.

Also, according to example embodiments, it is possible to provide cards classified into a general card corresponding to a card that allows a user to variously couple and use various components and a function card including a special function, and to make new revenues by registering and selling a function card developed by an outside developer.

Also, according to example embodiments, it is possible to predefine constituent elements required for editing a website/mobile site based on a component unit, to provide a user with the predefined constituent elements, and to support the user to create individual mobile pages to be included in the website/mobile site through a selection and a combination of provided components.

The units described herein may be implemented using hardware components, software components, or a combination thereof. For example, a processing device may be implemented using one or more computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

Figure 19:
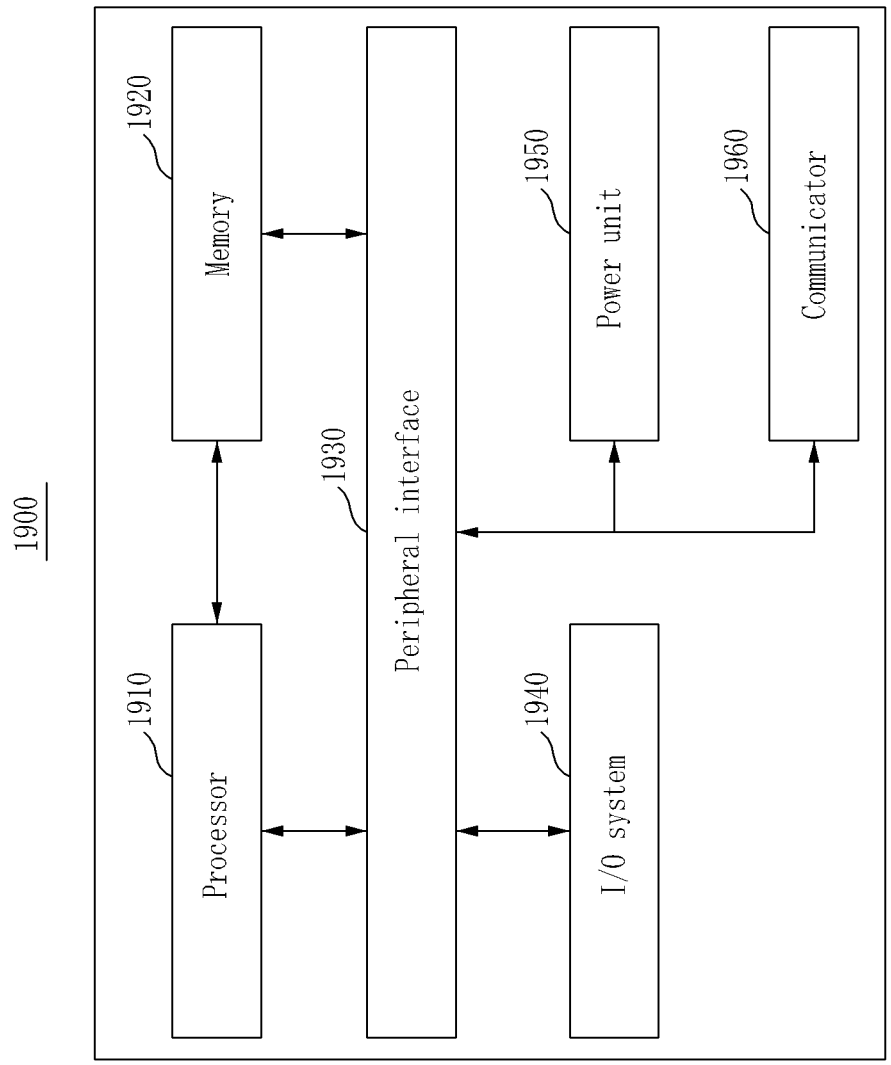
FIG. 19 is a block diagram illustrating the configuration of a computer system according to an example embodiment.

FIG. 19 is a block diagram illustrating an example of a configuration of a computer system 1900 according to an example embodiment. For example, the site management system 100, the user terminal 110, and/or a terminal of a connector may be configured as the computer system 1900. The computer system 1900 may include at least one processor 1910, at least one memory 1920, a peripheral interface 1930, an input/output (I/O) system 1940, a power unit 1950, and a communicator 1960.

The memory 1920 may include, for example, a high-speed random access memory (RAM), a magnetic disk, a static RAM (SRAM), a dynamic RAM (DRAM), a read only memory (ROM), a flash memory, or a non-volatile memory. The memory 1920 may include an instruction set, a variety of data, or a software module required for operating the computer system 1900. Here, a connection to the memory 1920 from another component such as the processor 910 or the peripheral interface 1930 may be controlled by the processor 1910.

The peripheral interface 1930 may couple an I/O peripheral device of the computer system 1900 with the processor 1910 and the memory 1920. The processor 1910 may perform a variety of functions for the computer system 1900 and may process data by executing the software module or the instruction set stored in the memory 1920.

The I/O system 1940 may couple various I/O peripheral devices with the peripheral interface 1930. For example, the I/O system 1940 may include a controller configured to couple a monitor, a keyboard, a mouse, a printer, or if necessary, a peripheral device such as a touch screen or a sensor, with the peripheral interface 1930. I/O peripheral devices may be coupled with the peripheral interface 1930 without using the I/O system 1940.

The I/O system 1940 may include one or more other I/O controllers. The other I/O controller may receive an electrical signal from the other I/O device or may transmit an electrical signal to the other I/O device. The other I/O device may include, for example, a button, a keyboard, a touch pad, a dial, a slider switch, and a joystick. Also, the other I/O controller may be coupled with any one of pointer devices, such as an infrared (IR) port, a USB port, and a mouse.

According to example embodiments, the other input device may include at least one physical button or virtual button. In the case of the virtual button, a button and a button controller may be portions of a touch screen and a display controller to be described below, respectively. The button may include an up/down button, a locker button, or a push button to control a volume of a speaker or a microphone. For example, when a user pushes the push button shortly, the touch screen may be unlocked and a process of unlocking a device by applying a gesture on the touch screen may be initiated. Also, the user may turn on or off a terminal by pushing the push button long.

According to example embodiments, the other input device may include at least one physical keyboard or virtual soft keyboard. For example, symbols of a standard configuration, for example, QWERTY, and/or a non-standard configuration may be used as an example of a keyboard. In the case of the virtual soft keyboard, a soft keyboard and a soft keyboard controller may be portions of a touch screen and a display controller, respectively. For example, the soft keyboard may include the number of graphics or soft keys less than the number of keys of the physical keyboard. A user may select at least one graphic of the soft keyboard and may display a symbol corresponding thereto on the touch screen.

According to example embodiments, the other input device may include a touch pad of activating or inactivating a predetermined function. The touch pad may include a touch-sensing area on which a visual output is not displayed, which is different from the touch screen. Also, the touch pad may be a touch-sensing surface separate from the touch screen or may be a portion of the touch-sensing surface formed and extended by the touch screen.

The power unit 1950 may supply power to all of or a portion of components of a terminal. For example, the power unit 1950 may include a power management system, at least one power source such as a battery or alternating current (AC), a charging system, a power failure detection circuit, a power converter or inverter, a power state indicator, or predetermined other components for producing, managing, and distributing power.

The communicator 1960 enables communication with another computer system using at least one external port. Alternatively, as described above, the communicator 1960 includes a radio frequency (RF) circuit depending on necessity, to transmit or receive an RF signal known as an electromagnetic signal, thereby enabling communication with the other communication system. For example, the RF circuit may convert an electrical signal to an electromagnetic signal, or may convert the electrical signal from the electromagnetic signal, and may communicate with a communication network or another communication device using the electromagnetic signal. The RF circuit may include a circuit known to perform the function. The circuit may include an antenna system, an RF transceiver, at least one amplifier, a tuner, at least one oscillator, a digital signal processor a CODEC chip set, a subscriber identification module (SIM) card, and a memory. However, the present disclosure is not limited thereto. The RF circuit may communicate with a wireless network such as a cellular phone network, a wireless local area network (WLAN), and/or metropolitan area network (MAN), an Internet network such as an intra network and/or World Wide Web (WWW), and other devices through wireless communication. The wireless communication may include Global System for Mobile Communications (GSM), Enhanced Data GSM Environment (EDGE), wideband code division multiple access (WCDMA), code division multiple access (CDMA), time division multiple access (TDMA), Bluetooth, Wireless Fidelity (Wi-Fi) such as IEEE 802.11a, IEEE 802.11b, IEEE 802.11g, and/or IEEE 802.11n, voice over Internet Protocol (VoIP), Worldwide Interoperability for Microwave Access (Wi-MAX), Long Term Evolution (LTE), an email protocol such as Internet Message Access Protocol (IMAP) and/or Post Office Protocol (POP), instant messaging such as eXtensible Messaging and Presence Protocol (XMPP), Session Initiation Protocol for Instant Messaging and Presence Leveraging Extensions (SIMPLE), Instant Messaging and Presence Service (IMPS), or Short Message Service (SMS), or a communication protocol undeveloped at the time of the filing date of the present application. Also, examples of the wireless communication are not limited thereto and a plurality of communication standards, protocols, and technologies may be employed.

The example embodiments of FIG. 19 are only an example of the computer system 1900, and the computer system 1900 may further include an additional component not illustrated in FIG. 19, or may have a configuration or an arrangement in which at least two components are coupled. For example, the computer system 1900 for a communication terminal of a mobile environment may further include a touch screen or a sensor in addition to components of FIG. 19. Also, a circuit for RF communication may be included in the communicator 1960. Components includable in the computer system 1900 may be configured as hardware including an integrated circuit specialized for at least one signal processing or application, software, or a combination of hardware and software.

For example, the computer system 1900 may further include an audio circuit (not shown). The audio circuit may provide an audio interface between a user and a terminal using a speaker and/or a microphone. The audio circuit may receive audio data from the peripheral interface 1930, may convert the audio data to an electrical signal, and may transmit the electrical signal to a speaker. The speaker may convert the electrical signal to a human-audible sound wave. The audio circuit may receive an electrical signal converted from a sound wave by a microphone. The audio circuit may convert the electrical signal to audio data and may transmit the audio data to the peripheral interface 1930 for processing. The audio data may be retrieved from the memory 1920 or the RF circuit by the peripheral interface 1930 or may be transmitted thereto. The audio circuit may further include a headset jack. The headset jack may provide an interface between a mobile audio I/O peripheral device, such as a head set including both input and output or an output-exclusive headphone, and the audio circuit.

As another example, the computer system 1900 may further include a display controller and/or a touch screen. The display controller may receive an electrical signal from a touch screen including a touch-sensing area, may transmit an electrical signal to the touch screen, or may perform transmitting and receiving of an electrical signal. Under control of the display controller, the touch screen may display a visual output for a user. The visual output may include a graphic, a text, an icon, a video, and a combination thereof (hereinafter, referred to as "graphics"). A portion of or all of the visual output may correspond to a user interface to be further described below.

A liquid crystal display (LCD) technology, a light emitting polymer display (LPD) technology, an organic light-emitting diode (OLED) technology, or an active-matrix organic light-emitting diode (AMOLED) technology may be employed for the touch screen. Other display technologies may also be applicable. Also, although the touch screen and the display controller may employ a capacitive technology, a resistive technology, an infrared technology, and a surface acoustic wave technology, the present disclosure is not limited thereto. A touch sensing technology known or to be developed in the future may be applied. Also, the touch screen and the display controller may sense a contact or a motion or a cancel of the contact using a proximity sensor array or other constituent elements to determine at least one contact point with the touch screen.

The display controller may be coupled with a screen in which a touch-sensing area is not included. The screen may receive an electrical signal from the display controller and may display a visual output for a user. The screen in which the touch-sensing area is no included may employ a plasma display panel (PDP) technology, an electronic paper display (EPD) technology, an LCD technology, an LPD technology, an OLED technology, or an AMOLED technology. Other display technologies may also be applicable. A terminal using the screen in which the touch sensing area is not included may provide an I/O device, such as a physical keyboard, a mouse, and a physical button, as a user interface for an operation.

At least one of the processor 1910, the peripheral interface 1930, and the I/O system 1940 may be configured on a single chip. Alternatively, a portion of at least one of the processor 1910, the peripheral interface 1930, and the I/O system 1940 may be configured on a single chip.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially designed to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention provided they come within the scope of the appended claims and their equivalents.

What is claimed is:

1. A method for creating a mobile site on a user terminal connected by a computer network to a site management system, comprising:
   providing, to the user terminal by the site management system, a plurality of cards having predefined functions and corresponding to a category selected by a user, each of the plurality of cards providing a form of a single independent mobile page of the mobile site, the form of each single independent mobile page defining an overall structure of components on the mobile page, and a plurality of predetermined templates corresponding to each of the plurality of cards and providing a structure of the entire corresponding card corresponding to the overall structure of the individual objects on the single independent mobile page, each of the templates having at least one image area and at least one text area that are arranged in a predetermined configuration, a set of a plurality of predetermined templates corresponding to a first card of the plurality of cards being differently configured from a set of a plurality of predetermined templates corresponding to a second card of the plurality of cards;
   displaying thumbnails representing the plurality of cards and thumbnails representing the plurality of predetermined templates corresponding to a selected one of the plurality of cards simultaneously on the user terminal;
   creating a mobile site on the user terminal corresponding to the category selected by the user and comprising a plurality of individual mobile pages each corresponding to a card having a template selected at the user terminal by the user from among the plurality of predetermined templates; and
   adding at least one component on at least one of the plurality of cards having the template selected by the user,
   wherein the plurality of cards comprises a general card configured through a selection and a combination of components by the user at the user terminal and a function card of which a function and a structure are predetermined.

2. The site creating method of claim 1, wherein the providing of the plurality of cards comprises:
   managing cards for each category to classify the created site; and
   providing cards corresponding to the category selected at the terminal of the user.

3. The site creating method of claim 1, wherein the components are configuration units used to classify constituent elements required for a site creation based on at least one of a purpose and a function.

4. The site creating method of claim 1, wherein the general card is configured by combining components selected at the user terminal of the user from among components provided based on at least one of the category of the site and a menu of a corresponding page.

5. The site creating method of claim 1, wherein the function card comprises a card created and registered by a third party.

6. The site creating method of claim 1, further comprising:
   charging the user based on at least one of the number of function cards used to create the site and a type of a function card.

7. The site creating method of claim 1, further comprising:
   charging the user based on the number of times that the function of the function card used to create the site is executed by a visitor of the site.

8. The site creating method of claim 1, further comprising:
   selling the function card to the user,
   wherein the providing of the plurality of cards comprises providing the general card and the function card sold to the user to the user terminal of the user.

9. The site creating method of claim 1, wherein a uniform resource locator (URL) comprising additional information of the card is allocated to each of at least two cards among the plurality of cards.

10. The site creating method of claim 9, further comprising:
    receiving a keyword through a terminal of a connector; and
    providing a card of a URL comprising additional information associated with the keyword to the terminal of the connector as a landing page.

11. A method for creating a mobile site on a user terminal connected by a computer network to a site management system, comprising:
    providing, to the user terminal by the site management system, a plurality of cards having predefined functions and corresponding to a category selected by a user, each of the plurality of cards providing a form of a single independent mobile page of the mobile site, the form of each single independent mobile page defining an overall structure of components on the mobile page, and a plurality of predetermined templates corresponding to each of the plurality of cards and providing a structure of the entire corresponding card corresponding to the overall structure of the individual objects on the single independent mobile page, each of the templates having at least one image area and at least one text area that are arranged in a predetermined configuration, a set of a plurality of predetermined templates corresponding to a first card of the plurality of cards being differently configured from a set of a plurality of predetermined templates corresponding to a second card of the plurality of cards;

displaying thumbnails representing the plurality of cards and thumbnails representing the plurality of predetermined templates corresponding to a selected one of the plurality of cards simultaneously on the user terminal;

creating a mobile site on the user terminal corresponding to the category selected by the user and comprising at least one first mobile page corresponding to a card having a template selected at the user terminal by the user from among the plurality of predetermined templates, and a second mobile page comprising, as a component, at least one card selected at the user terminal by the user from among the plurality of cards, or a uniform resource allocator (URL) comprising additional information of a card corresponding to the at least one first mobile page in the mobile site;

receiving a keyword through a terminal of a connector; and providing the connector with a third page of a URL comprising additional information associated with the keyword as a landing page.

12. Non-transitory computer-readable storage media comprising a program to implement the method of claim 1.

13. A site management system configured to create a mobile site on a user terminal connected by a computer network to the site management system, comprising:

a processor configured to perform a plurality of operations defined by a plurality function unit comprising, a card provider unit configured to provide to the user terminal a plurality of cards having predefined functions and corresponding to a category selected by a user, each of the plurality of cards providing a form of a single independent mobile page of the mobile site, the form of each single independent mobile page defining an overall structure of components on the mobile page, and a plurality of predetermined templates corresponding to each of the plurality of cards and providing a structure of the entire corresponding card corresponding to the overall structure of the individual objects on the single independent mobile page, each of the templates having at least one image area and at least one text area that are arranged in a predetermined configuration, a set of a plurality of predetermined templates corresponding to a first card of the plurality of cards being differently configured from a set of a plurality of predetermined templates corresponding to a second card of the plurality of cards, wherein thumbnails representing the plurality of cards and thumbnails representing the plurality of predetermined templates corresponding to a selected one of the plurality of cards are displayed simultaneously on the user terminal;

a site creator unit configured to create a mobile site comprising a plurality of individual mobile pages each corresponding to a card having a template selected at the user terminal by the user from among the plurality of predetermined templates and adding at least one component on at least one of the plurality of cards having the template selected at the user terminal, wherein the plurality of cards comprises a general card configured through a selection and a combination of components by the user at the user terminal and a function card of which a function and a structure are predetermined.

14. The site management system of claim 13, wherein the card provider unit comprises:

a card manager unit configured to manage cards for each category to classify the created site; and a category-based card provider unit configured to provide cards corresponding to the category selected at the terminal of the user.

15. The site management system of claim 13, wherein the components are configuration units used to classify constituent elements required for a site creation based on at least one of a purpose and a function.

16. The site management system of claim 13, wherein the general card is configured by combining components selected at the user terminal of the user from among components provided based on at least one of the category of the site and a menu of the at least one page.

17. The site management system of claim 13, wherein the function card comprises a card created and registered by a third party.

18. The site management system of claim 13, wherein the function card is configured as a single independent page or a single component coupled with the general card, based on a selection of the user.

19. The site management system of claim 13, further comprising:

a charger unit configured to charge the user based on at least one of the number of function cards used to create the site and a type of a function card.

20. The site management system of claim 13, further comprising:

a charger unit configured to charge the user based on the number of times that the function of the function card used to create the site is executed by a visitor of the site.

21. The site management system of claim 13, further comprising:

a function card seller unit configured to sell the function card to the user, wherein the card provider unit is configured to provide the general card and the function card sold to the user to the terminal of the user.

22. A site management system configured to create a mobile site on a user terminal connected by a computer network to the site management system, comprising:

a processor configured to perform a plurality of operations defined by a plurality function unit comprising, a card provider unit configured to provide to the user terminal a plurality of cards having predefined functions and corresponding to a category selected by a user, each of the plurality of cards providing a form of a single independent mobile page of the mobile site, the form of each single independent mobile page defining an overall structure of components on the mobile page, and a plurality of predetermined templates corresponding to each of the plurality of cards and providing a structure of the entire corresponding card corresponding to the overall structure of the individual objects on the single independent mobile page, each of the templates having at least one image area and at least one text area that are arranged in a predetermined configuration, a set of a plurality of predetermined templates corresponding to a first card of the plurality of cards being differently configured from a set of a plurality of predetermined templates corresponding to a second card of the plurality of cards;

wherein thumbnails representing the plurality of cards and thumbnails representing the plurality of predetermined templates corresponding to a selected one of the plurality of cards are displayed simultaneously on the user terminal;

a site creator unit configured to create a mobile site on the user terminal corresponding to the category selected by the user and comprising at least one first mobile page each corresponding to a card having a template selected at the user terminal by the user from among the plurality of predetermined templates, and a second mobile page comprising, as a component, at least one card selected at the user terminal, or a uniform resource allocator (URL) comprising additional information of a card corresponding to the at least one first page in the site;

a keyword receiver unit configured to receive a keyword through a terminal of a connector; and a page provider unit configured to provide the connector with a third page of a URL comprising additional information associated with the keyword as a landing page.

* * * * *